(12) United States Patent
Guo et al.

(10) Patent No.: US 10,736,119 B2
(45) Date of Patent: Aug. 4, 2020

(54) RADIO RESOURCE MANAGEMENT IN LARGE WIRELESS NETWORKS

(71) Applicant: Northwestern University, Evanston, IL (US)

(72) Inventors: Dongning Guo, Chicago, IL (US); Zhiyi Zhou, Chicago, IL (US)

(73) Assignee: Northwestern University, Evanston, IL (US)

(*) Notice: Subject to any disclaimer, the term of this patent is extended or adjusted under 35 U.S.C. 154(b) by 118 days.

(21) Appl. No.: 15/900,966

(22) Filed: Feb. 21, 2018

(65) Prior Publication Data

US 2018/0242325 A1 Aug. 23, 2018

Related U.S. Application Data

(60) Provisional application No. 62/461,441, filed on Feb. 21, 2017.

(51) Int. Cl.
*H04W 72/04* (2009.01)
*H04W 28/16* (2009.01)

(52) U.S. Cl.
CPC ....... *H04W 72/0486* (2013.01); *H04W 28/16* (2013.01)

(58) Field of Classification Search
CPC .......................... H04W 72/0486; H04W 28/16
See application file for complete search history.

(56) References Cited

U.S. PATENT DOCUMENTS

| 9,660,789 B2* | 5/2017 | Nammi | H04W 28/16 |
| 2007/0091983 A1 | 4/2007 | Siriwongpairat et al. | |
| 2008/0144568 A1* | 6/2008 | Usuda | H04W 28/20 370/329 |
| 2010/0189057 A1* | 7/2010 | Nago | H04W 72/0486 370/329 |
| 2010/0248730 A1* | 9/2010 | Han | H04W 16/10 455/450 |

(Continued)

OTHER PUBLICATIONS

Andrews et al., "What will 5G be?," IEEE J. Sel. Areas Commun., vol. 32, No. 6, pp. 1065-1082, Jun. 2014.

(Continued)

*Primary Examiner* — Wutchung Chu
(74) *Attorney, Agent, or Firm* — Bell & Manning LLC

(57) ABSTRACT

A system for allocating resources in a communication network includes a plurality of access points and a central controller having a transceiver and a processor. Each of the plurality of access points is configured to identify traffic information and channel information and transmit the traffic information and the channel information to the central controller. The central controller is configured to receive the traffic information and the channel information from each of the plurality of access points and to determine resource allocation recommendations based at least in part on the received traffic information and the received channel information. The central controller is also configured to transmit the resource allocation recommendations to the plurality of access points. Each of the plurality of access points is configured to allocate a resource based on the resource allocation recommendations and on local network information.

19 Claims, 12 Drawing Sheets

(56) References Cited

U.S. PATENT DOCUMENTS

| | | | |
|---|---|---|---|
| 2011/0029347 A1* | 2/2011 | Kozat | G06Q 30/08 705/7.39 |
| 2012/0135743 A1* | 5/2012 | Ebiko | H04W 72/082 455/452.2 |
| 2012/0178483 A1* | 7/2012 | Rosenau | H04W 28/16 455/509 |
| 2012/0236774 A1 | 9/2012 | Guey et al. | |
| 2013/0065626 A1* | 3/2013 | Yokoyama | H04W 74/0875 455/509 |
| 2013/0137447 A1 | 5/2013 | Zhang et al. | |
| 2013/0316722 A1* | 11/2013 | Bader | H04W 88/18 455/453 |
| 2014/0355538 A1* | 12/2014 | Chen | H04W 72/048 370/329 |
| 2016/0302217 A1* | 10/2016 | Yang | H04W 72/0453 |
| 2017/0013632 A1* | 1/2017 | Bercovich | H04W 72/042 |
| 2017/0134304 A1* | 5/2017 | Lin | H04L 67/1097 |
| 2017/0273099 A1* | 9/2017 | Zhang | H04W 72/14 |
| 2018/0316626 A1* | 11/2018 | Tian | H04L 47/803 |

OTHER PUBLICATIONS

Stolyar et al., "Self-organizing dynamic fractional frequency reuse in OFDMA systems," IEEE Infocom, Phoenix, USA, Apr. 2008, pp. 1364-1372.

Madan et al., "Cell association and interference coordination in heterogeneous LTE-A cellular networks," IEEE J. Sel. Areas Commun., vol. 28, No. 9, pp. 1479-1489, Dec. 2010.

Ye et al., "User association for load balancing in heterogeneous cellular networks," IEEE Trans. Wireless Commun., vol. 12, No. 6, pp. 2706-2716, Jun. 2013.

Shen et al., "Distributed pricing-based user association for downlink heterogeneous cellular networks," IEEE J. Sel. Areas Commun., vol. 32, No. 6, pp. 1100-1113, Jun. 2014.

Kuang et al., "Optimal joint user association and multipattern resource allocation in heterogeneous networks," IEEE Trans. Sig. Proc., vol. 64, pp. 3388-3401, Jul. 1, 2016.

Huang et al., "Joint scheduling and resource allocation in uplink OFDM systems for broadband wireless access networks," IEEE J. Sel. Areas Commun., vol. 27, pp. 226-234, Feb. 2009.

Fooladivanda et al., "Joint resource allocation and user association for heterogeneous wireless cellular networks," IEEE Trans. Wireless Commun., vol. 12, No. 1, pp. 248-257, Jan. 2013.

Ali et al., "Dynamic frequency allocation in fractional frequency reused OFDMA networks," IEEE Trans. Wireless Commun., vol. 8, pp. 4286-4295, Aug. 2009.

Liao et al., "Base station activation and linear transceiver design for optimal resource management in heterogeneous networks," IEEE Trans. Signal Process., vol. 62, No. 15, pp. 3939-3952, Aug. 1, 2014.

Lim et al., "Energy-efficient resource allocation for OFDMA-based multi-RAT networks," IEEE Trans. Wireless Commun., vol. 13, No. 5, pp. 2696-2705, May 2014.

Deb et al., "Algorithms for enhanced inter-cell interference coordination (eICIC) in LTE HetNets," IEEE/ACM Trans. Netw., vol. 22, No. 1, pp. 137-150, Feb. 2014.

Zhou et al., "Licensed and unlicensed spectrum allocation in heterogeneous networks," IEEE Trans. Commun., Jan. 19, 2017, pp. 1815-1827.

Ao et al., "An efficient approximation algorithm for online multitier multi-cell user association," in Proc. ACM MobiHoc, Paderborn, Germany, Jul. 4, 2016.

Zhuang et al., "Traffic-driven spectrum allocation in heterogeneous networks," IEEE J. Sel. Areas. Commun., vol. 33, pp. 2027-2038, May 20, 2015.

Zhuang et al., "Energy-efficient cell activation, user association, and spectrum allocation in heterogeneous networks," IEEE J. Sel. Areas Commun., vol. 34, pp. 823-831, Apr. 2016.

Zhuang et al., "Scalable spectrum allocation and user association in networks with many small cells," arXiv:1701.03247v1, Jan. 12, 2017.

Crowder et al., "Solving large-scale zero-one linear programming problems," Operation Research, vol. 31, No. 5, pp. 803-834, (1983).

Frank et al., "An algorithm for quadratic programming,", pp. 95-110, (1956).

3GPP TR 36.814, "Further advancements for E-UTRA physical layer aspects (Release 9)," V9.0.0, Mar. 2010.

Design and Deployment of Small Cell Networks, Editors Anpalagan et al., Cambridge University Press, (2016), chapter 5 Dense Networks of Small Cells., Liu et al., pp. 96-121.

Teng et al., Dual-timescale spectrum management in wireless heterogeneous networks, arXiv:1604.02781v1, Apr. 1, 2016.

The Non-Final Office Action issued in U.S. Appl. No. 16/146,276 dated Sep. 19, 2019, pp. 1-11.

* cited by examiner

| Parameters | Value/Function |
|---|---|
| AP transmit power | 23 dBm |
| Total bandwidth | 10 MHz |
| Average packet length | 0.5 Mbits |
| AP to UE pathloss (LOS) | $30.18 + 26.7\log_{10}(R)$ |
| AP to UE pathloss (NLOS) | $34.53 + 36\log_{10}(R)$ |
| Lognormal shadowing standard deviation (LOS) | 4 dB |
| Lognormal shadowing standard deviation (NLOS) | 10 dB |

FIG. 6

RADIO RESOURCE MANAGEMENT IN LARGE WIRELESS NETWORKS

CROSS-REFERENCE TO RELATED APPLICATIONS

The present application claims a priority benefit to U.S. Provisional Patent App. No. 62/461,441 filed on Feb. 21, 2017, the entire disclosure of which is incorporated herein by reference.

BACKGROUND

Recent years have witnessed an explosion of mobile data traffic due to proliferation of smart terminals (e.g., smart phones and tablet personal computers) and increasing use of mobile applications. It is predicted that global mobile data traffic will increase eightfold between 2015 and 2020. Wireless operators are investing heavily in infrastructure, including increasingly denser deployment of access points (APs) to improve cellular coverage and capacity for homes and businesses in urban, suburban, as well as rural areas.

SUMMARY

An illustrative system for allocating resources in a communication network includes a plurality of access points and a central controller having a transceiver and a processor. Each of the plurality of access points is configured to identify its traffic information and channel information, and transmit the identified traffic information and the channel information to the central controller. The central controller is configured to receive the traffic information and the channel information from each of the plurality of access points and to determine resource allocation recommendations based at least in part on the received traffic information and the received channel information. The resource allocation recommendations are determined on a timescale measured in seconds, and each resource allocation recommendation is specific to a given access point. The central controller is also configured to transmit the resource allocation recommendations to the plurality of access points. Each of the plurality of access points is configured to allocate a resource based on the resource allocation recommendations and on local network information.

A method for allocating resources in a communication network includes receiving, by a transceiver of a central controller, traffic information and channel information from each of a plurality of access points. The method also includes determining, by a processor of the central controller, resource allocation recommendations based at least in part on the received traffic information and the received channel information. Determining the resource allocation recommendations includes updating a candidate pattern set, where the candidate pattern set includes all possible patterns, and where a pattern comprises a subset of the plurality of access points. Determining the resource allocation recommendations also includes identifying one or more patterns from the candidate pattern set that are to receive one or more resources. Determining the resource allocation recommendations further includes determining whether an optimality gap associated with the resource allocation recommendations is below a threshold. The method further includes transmitting, by the transceiver, the resource allocation recommendations to the plurality of access points.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 6 is a table depicting parameters compliant with the LTE standard in accordance with an illustrative embodiment.

DETAILED DESCRIPTION

Figure 1:
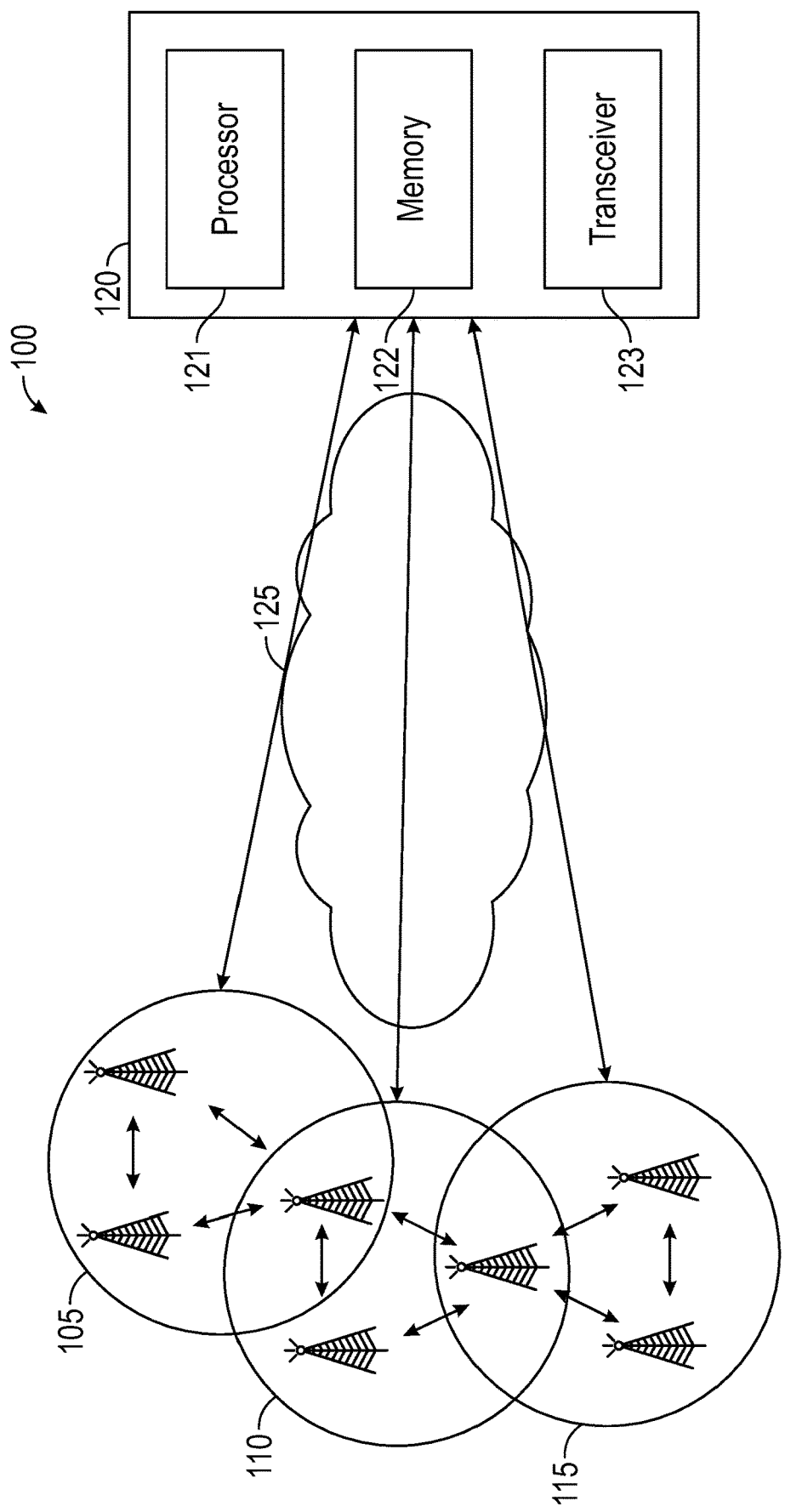
FIG. 1 depicts a high-level architecture of a system in accordance with an illustrative embodiment.

Described herein are a system and method that enable joint optimization of radio resource allocation in an unprecedented scale. Simulations described below demonstrate the efficiency and effectiveness of the new technology in a network consisting of a thousand or more access points and several thousand user equipments (UEs).

With increasing number of smart terminals and widening use of mobile Internet applications, there has been an explosion of mobile traffic in commercial networks. To support the tremendous growth of data traffic, a dense deployment of access points (APs) or small cells over a large area has been considered as a promising candidate for future 5G networks. The flexible multi-tier architecture can better match highly dynamic traffic demands of UEs to possible serving APs. Due to irregularities of network topology and sophisticated interference conditions, efficient spectrum allocation and user association becomes extremely crucial for harnessing the full power of the infrastructure.

There have been many studies of resource management in cellular networks. In one study, a dynamic fractional frequency reuse scheme was proposed to combat the intersector interference. In another study, a heuristic greedy search was proposed for user association. In other studies, a utility maximization framework and pricing-based association methods were proposed. The association problem has also been jointly considered with resource allocation. However, in general, these studies give sub-optimal solutions either by solving a non-convex optimization problem for a small network or by running a distributed algorithm for a large network, which is far from optimal.

To address resource management challenges, the inventors have derived an equivalent reformulation of the fundamental resource allocation and user association problem from the viewpoints of UEs. Such user-centric reformulation captures the fact that each UE's performance depends only on the interference pattern of no more than a constant number of APs in the UE's neighborhood. This allows a low-complexity reformulation of the global problem, which reduces the total number of variables from exponential to quadratic in the number of UEs. Specifically, described herein is a pattern pursuit algorithm and proof that it can yield a solution within any given gap from the global optimum. The framework here applies to all concave utility functions.

The goal of the present subject matter is to allocate resources in a metropolitan area network consisting of a very large number of APs. The total overhead for a network controller to perform the proposed resource allocation scheme is quite small since the timescale of resource adaptation is considered to be once every few seconds or minutes. For example, the rate for sending 30,000 parameters (16 bits each) every minute is only 8 kilobits per second (kbps). To validate the performance of the proposed scheme, packet-level simulations are carried out. It has been demonstrated that the proposed solution for networks with 1000 APs or more and 2500 UEs or more. It is observed that the proposed scheme significantly outperforms other conventional schemes, and that the performance is within a 7% gap from (an upper bound of) the globally optimal utility in a typical scenario.

Due to its simplicity, distributed AP-centric resource management has been the dominant design principle in the first generation (1G) through the fourth generation (4G) cellular networks. Basically, each AP optimizes its performance metrics independently with little or no direct input from other APs. In most cases, APs/cells are carefully placed and configured so that mutual interference can be tolerated. However, with denser deployment of APs, it becomes increasingly harder to place them at the most desirable locations due to leasing constraints and other geographical constraints. Such dense deployment causes the traffic variations in smaller cells to be much more pronounced, leading to more complex interference conditions. As a result, denser AP deployment alone does not lead to increased total network capacity. It is therefore crucial for nearby APs to coordinate allocations of all radio resources, especially radio spectrum and power, so that mutual interference is effectively managed.

Several coordinated resource management techniques have been developed in long term evolution (LTE) and LTE-Advanced (LTE-A) standards. These include inter-cell interference coordination (ICIC), enhanced ICIC (eICIC), and further enhanced ICIC (feICIC). In particular, eICIC lets an AP use almost blank subframes (ABS) to mitigate interference to neighboring cells. The coordination is accomplished through communication between neighboring APs.

However, to date there has been no practical design that enables a large number of APs in a network covering a very large geographical area (hundreds of square kilometers or more) to fully coordinate their physical resource allocations. To address this, described herein are systems and methods for large-scale joint optimization of radio resource management that can be scaled to a thousand APs/cells or more. The technology is based on a dual-timescale optimization framework for spectrum allocation, user association, power control, and link scheduling. On a relatively slow timescale (e.g., seconds or minutes), a central controller collects traffic and channel state information from all APs and periodically sends resource allocation instructions/recommendations to the scheduler of each AP in the network. On a fast timescale (e.g., milliseconds), each AP exchanges local information (such as queue lengths and channel state information) with neighboring APs and schedules links and physical resource blocks (PRBs) based on the instructions/recommendations from the central controller as well as information collected from the other APs.

This subject matter described herein is well matched to any resource pooling designs such as the cloud radio access network (C-RAN). Both resource allocation and link scheduling problems are formulated as tractable optimization problems which can be solved efficiently at the central controller over slow timescale and at each AP over fast timescale, respectively. Moreover, as discussed in more detail below, the solution obtained by the central controller is mathematically guaranteed to be within any given tolerance to the optimal allocation. The systems and methods of the present subject matter offer two allocation schemes for selection, which are referred to as conservative allocation and adaptive allocation. The adaptive allocation scheme performs moderately better with additional computational complexity.

Typically, in a modern wireless communications system, such as a Third Generation Partnership Project (3GPP) Long Term Evolution (LTE) compliant communications system, a number of cells or evolved NodeBs (eNB) (also commonly referred to as NodeBs, base stations, base terminal stations, communications controllers, network controllers, controllers, APs, and so on) may be arranged into a cluster of cells, with each cell having one or multiple transmit antennas. Additionally, each cell or eNB may be serving a number of users (also commonly referred to as User Equipments (UEs), wireless devices, mobile stations, users, subscribers, terminals, and so forth) based on a priority metric, such as fairness, proportional fairness, round robin, and the like, over a period of time. It is noted that the terms cell, AP, and eNB are often used interchangeably. For consistency herein, the network is assumed to consist of a number of APs and a number of UEs.

FIG. 1 depicts a high-level architecture of a system 100 in accordance with an illustrative embodiment. The system 100 in FIG. 1 includes three AP clusters 105, 110, and 115, each of which includes a plurality of APs. It is to be understood that, in practice, each system will include a large number of AP clusters and that the use of only the three AP clusters 105, 110, and 115 is for illustration purposes. Similarly, each of the AP clusters may include a large number of individual APs. As depicted in FIG. 1, there is some overlap in the coverage areas of the various AP clusters such that some APs appear in multiple clusters. The individual APs in each of the AP clusters communicate with a central controller 120 by way of a core network 125. The central controller 120 can be any computing system, and includes at least a processor 121, a memory 122, and a transceiver 123 for exchanging information.

The individual APs in each of the AP clusters measure the traffic and channel state information and interference conditions for itself and/or its neighbors, and transmit the information to the central controller 120 periodically. The APs may also measure quality of service (QoS) information, a number of UEs being served, signal-to-noise ratios, link usage, and any other network-related information for provision to the central controller 120. In each period, the central controller 120 collects the information from all APs as the input, computes the most desirable resource allocations according to predetermined optimal criteria, and distributes the corresponding allocation instructions/recommendations to the APs. The predetermined optimal criteria can be QoS, signal-to-noise ratio, and/or any other metric pertaining to network performance. In an illustrative embodiment, only instructions/recommendations pertaining to a given AP are sent to that AP. This periodic process is typically carried out on a relatively slow timescale (e.g., seconds) in order to accommodate the latency in information gathering and computation time.

The information exchange between the individuals APs can be realized through direct links between APs, which are often referred to as backhauls. The information exchange between the individual APs and the network controller 120 is the core network 125, which can also be referred to as a backbone network, which is a wireline network. The aggregate data rate of such exchanges is very small compared to the capacity of the backhaul and backbone networks.

On a fast timescale, each AP exchanges queue length and channel state information with neighboring APs and schedules links based on the exchanged information and on the recommended allocations from the central controller 120 in order to maximize the utilities of all its neighboring APs. The utility of each AP can be general including the sum rate, minimum UE service rate (max-min fairness), and sum log-rate (proportional fairness). In an illustrative embodiment, the APs do not rely solely on the recommendations from the central controller 120 because of the inherent latency involved in receiving the recommendations.

Figure 2:
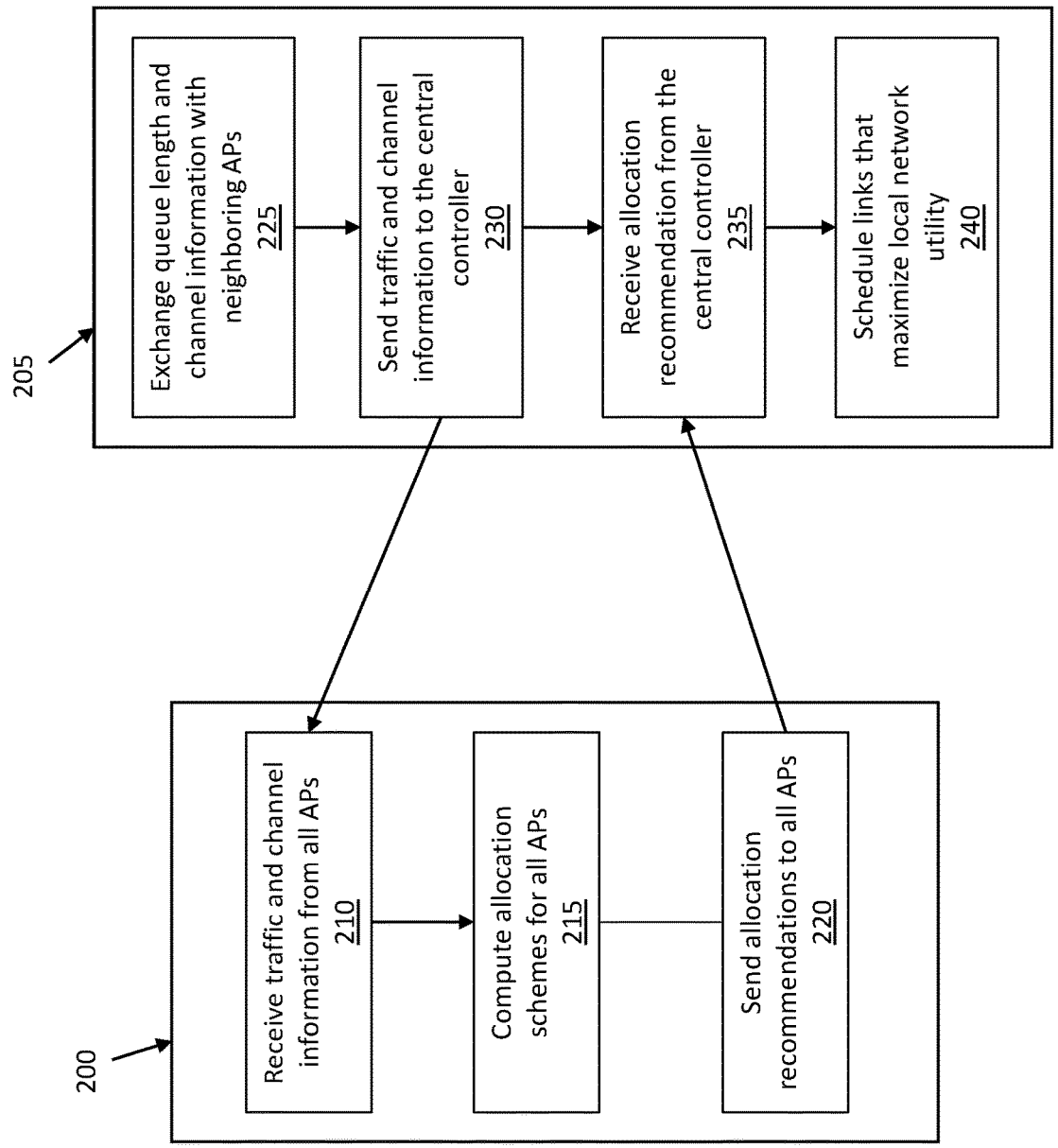
FIG. 2 is a flow diagram depicting operations performed by the system 100 in accordance with an illustrative embodiment.

FIG. 2 is a flow diagram depicting operations performed by the system 100 in accordance with an illustrative embodiment. In alternative embodiments, fewer, additional, and/or different operations may be performed. Additionally, the use of a flow diagram is not intended to be limiting with respect to the order of operations performed. The operations performed in block 200 are slow timescale operations performed at the central controller, and operations performed in block 205 are fast timescale operations performed at an individual AP. In an operation 210, the central controller receives traffic and channel information from all APs. In an operation 215, the central controller computes allocation schemes for all APs based on the received information. In an operation 220, the central controller sends allocation recommendations to all APs.

In an operation 225, the AP exchanges queue length and channel information with its neighboring APs such that the APs can use this information in determining whether to implement a recommendation received from the central controller. In an operation 230, the AP sends its traffic and channel information to the central controller. In an operation 235, the AP receives an allocation recommendation from the central controller. In an operation 240, the AP schedules links that maximize local network utility. In an illustrative embodiment, the AP schedules the links based on both the recommendation from the central controller and on the locally exchanged information from neighboring APs.

The systems described herein are suitable for implementation in any existing centralized solution (typically in a small cluster), e.g., a C-RAN. Since the central controller collects information on a slow timescale (once every a few seconds/minutes), which is much slower than the channel coherence time, the average channel conditions can be accurately measured. In addition, the slow timescale also allows ample time for channel state information exchange/feedback and joint optimization of resource allocations in every period. In the meantime, since each AP only has to exchange queue length and channel state information with neighboring APs, the overhead of exchanging information on a fast timescale is insignificant in each individual cell.

The systems described herein can be implemented in a very large wireless network consisting of hundreds or thousands of APs, which may include many APs and C-RANs as sub-networks. A single central controller collects information from all or a large subset of the APs and computes efficient allocation instructions/recommendations for all or a subset of the APs. In a regional or nation-wide network, one or a few such central controllers may be deployed in each metropolitan area.

On the slow timescale, the task of the central controller is to determine which resource segments (e.g., frequency/time resources) to allocate to each AP, and subsequently, which sub-segments to allocate to specific UEs associated with that AP. The goal is usually to maximize some long-term network utility such as QoS. The technology is broadly applicable to arbitrary number of heterogeneous APs over an arbitrary geographical area over arbitrary heterogeneous frequency bands (which may or may not be contiguous) using arbitrary heterogeneous physical layer signaling. The technology applies to both the uplink and downlink transmissions in a network. For concreteness and clarity, the present description often uses a generic downlink transmission setting with several homogenous APs and homogeneous UEs using identical signaling over a single homogeneous frequency band.

The notion of a pattern is important to resource allocation in an interference environment. A pattern refers to a subset of APs. In a network of n APs, there are $2^n$ distinct patterns, including an empty one. A resource is considered to be allocated to a pattern if only APs in that pattern are allowed to use/share the resource. An allocation of resources to all APs can be thought of as dividing the resources into $2^n$ different pieces with various sizes, with each piece allocated to one pattern. In practice, it oftentimes occurs that all but a small number of patterns are allocated zero resources.

Since each pattern corresponds to the set of transmitters in the downlink, it determines the interference condition in the network, which implies the efficiency of each AP-UE link. The central controller should select the best ones out of all $2^n$ patterns along with the corresponding amounts of resources that maximize the network utility of interest. The spectrum allocation and user association problem at the central controller side can be formulated as a convex optimization problem with more than $2^n$ variables (formulation P1 below), which is computationally prohibitive in a large network with thousands of APs. As opposed to such direct optimization formulation, introduced herein is a computationally feasible problem formulation (see P2 below). Basically, the total number of variables and constraints in P2 increases only linearly with the number of UEs. The number of AP's that can serve a UE is assumed to be upper bounded by a constant, which is always the case in practice.

The tractable formulation P2 is obtained based in part on the fact that a UE can only be served by one or multiple APs from a subset of a small number of APs near the UE (defined as candidate APs). This is due to rapid signal attenuation over distance, which is referred to as path loss and means that only a small number of APs are within range of that UE. It suffices for each UE to only consider its candidate APs. Meanwhile, it is sufficient for each AP to only consider resource allocation among APs that may interfere with its associated UEs. The tractable formulation P2 uses only local variables defined in neighborhoods of UEs while maintaining the consistency of allocations between overlapping neighborhoods.

The tractable formulation P2 can be applied to general large networks consisting of different kinds of APs transmitting power at different power levels. The formulation exploits the hidden sparse structure of the UE-AP association. It also helps reduce the overhead of transmitting recommended patterns to each AP since each AP only has to receive good local patterns that exclude information about other APs that are far away from it.

The tractable formulation P2 is a nonlinear mixed-integer optimization problem. Discussed in more detail below is a pattern-pursuit algorithm, described as Algorithm 1, for solving the optimization problem at the central controller. It is a first-order optimization algorithm. In each iteration, the algorithm considers a linear approximation of the objective function, and moves towards the maximizer of this linear function (taken over the same domain), which identifies a candidate allocation pattern. The spectrum allocation solution is chosen from all candidate patterns. Since the central controller is solving a binary linear programming in each iteration, due to the sparsity structure of the constraints, it can be solved quickly using standard algorithms based on branch and cut. Moreover, thanks to the convexity of the utility function, the optimality gap can be computed in each iteration as well. Hence, the algorithm can be terminated when the optimality gap is below a preset threshold. The resource allocation problem can be solved efficiently and near-optimally at the central controller on a slow timescale.

Figure 3:
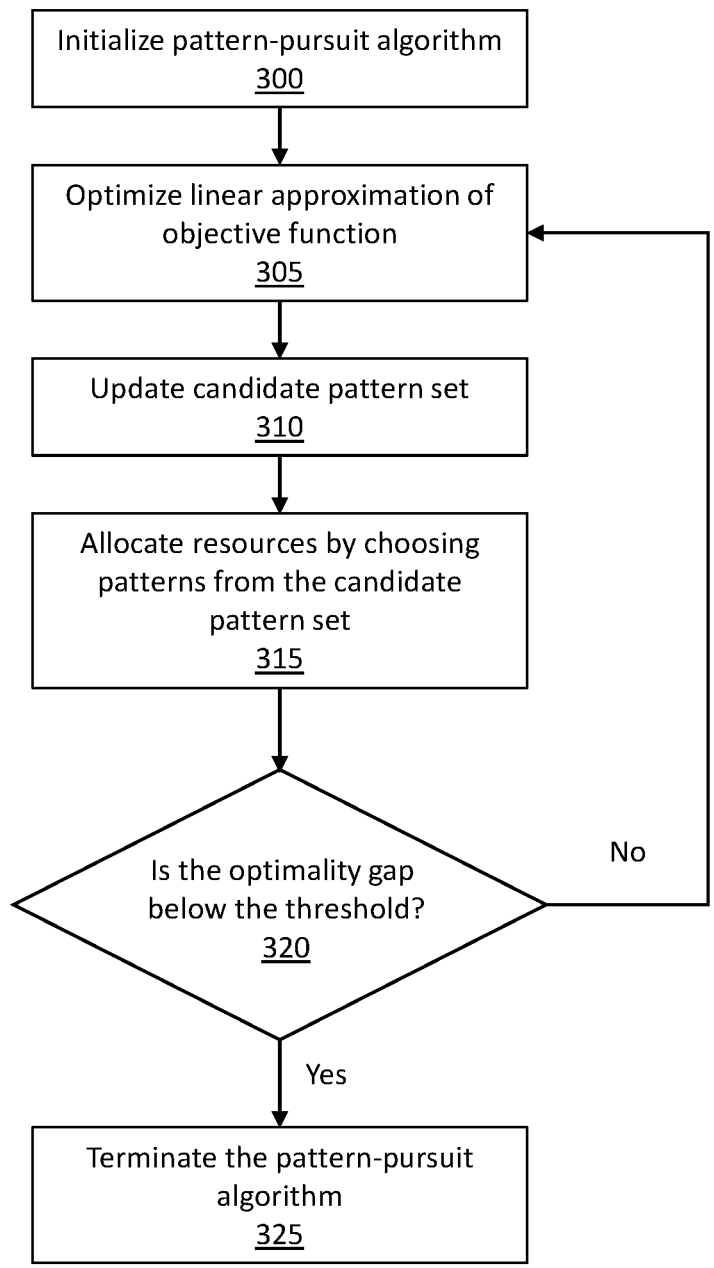
FIG. 3 is a high level flow diagram illustrating operations performed by the pattern-pursuit algorithm in accordance with an illustrative embodiment.

FIG. 3 is a high level flow diagram illustrating operations performed by the pattern-pursuit algorithm in accordance with an illustrative embodiment. In alternative embodiments, fewer, additional, and/or different operations may be performed. Additionally, the use of a flow diagram is not intended to be limiting with respect to the order of operations performed. In an operation 300, the pattern-pursuit algorithm is initialized by the central controller. In an operation 305, a linear approximation of the objective function is optimized. In an operation 310, a candidate pattern set is updated. Resources are allocated by choosing patterns from the candidate pattern set in an operation 315. In an operation 320, a determination is made regarding whether the optimality gap is below a predetermined threshold. If it is determined that the optimality gap is not below the threshold, the process reverts again to operation 305 and continues the process until the optimality gap is below the threshold. If it is determined that the optimality gap is below the threshold, the pattern-pursuit algorithm is terminated in an operation 325.

The pattern-pursuit algorithm described herein fits the system structure because one recommended (or good) pattern is found at each iteration. Therefore, the central controller can keep sending recommended patterns to all APs after each iteration. Moreover, this also facilitates the updating process within each AP.

Once the central controller obtains the near-optimal solution (i.e., some recommended patterns and their corresponding weights), it sends these recommended patterns to each AP as an instruction or recommendation to its scheduler. Since each AP only interferes with its neighboring APs, the instructions and/or recommendations to each AP may only include the allocation information for that AP and its neighboring APs, with very small information exchange overhead.

The aforementioned allocation scheme is called conservative allocation in the sense that all the APs in a specific pattern are assumed to be always interfering with each other. The advantage of the conservative allocation is that there is no need for the scheduler (or whichever unit that performs rate adaptation) to know the state of the other APs included in the pattern. However, the conservative rate is a lower bound on the actual rate because the interference is overestimated. Therefore, to seek a better analytic solution, an adaptive allocation scheme is also introduced, which better models the interaction among APs.

The main idea of the adaptive allocation is the adoption of the notion of an active set instead of assuming all APs in a pattern are always interfering with each other. An active set is a set of APs that actually transmit signals. In a stable interactive queueing system, each active set appears for a fraction of time (in other words, with certain probability). Therefore, the queueing behavior of each UE is averaged over all possible active sets. An iterative algorithm alternately updates the allocation variables and utilization variables are proposed to yield an adaptive allocation. For implementation, one may choose either the conservative allocation scheme or the adaptive allocation scheme, or a combination of the two in some form.

On a fast timescale, each AP schedules link transmissions following the instructions/recommendations received from the central controller. The link/packet scheduling problem at the AP side is formulated as an optimization problem. The inputs include the instantaneous queue lengths, the channel state information of all links within its neighborhood, and the instructions/recommendations from the central controller. At each time slot, each AP selects a local pattern to maximize some local network utility. One embodiment is to use the patterns from the central controller as the set of feasible patterns, and select one or a few local patterns with the best match to the instructions/recommendations.

It is noted that that the formulated optimization problem of link scheduling is similar to P1. The differences include: (1) The objective function is the weighted sum rate with the weight being the queue length of each link; and (2) The optimization problem aims to choose one optimal pattern from the recommended patterns sent from the central controller. The formulated optimization problem is a linear programming with finite feasible region, which can be solved by enumerating all recommended patterns on a fast timescale.

Detailed Discussion of the Algorithm

The discussion below considers the downlink of a network consisting of n APs and k UEs. A network controller is informed of the intensity of independent homogeneous Poisson traffic intended for every UE. The central controller also receives sufficiently accurate reports of channel/interference information from all the APs. The resource allocation is performed on a slow timescale, e.g., once every a few seconds or minutes, which makes information exchange (channel state information feedback) and joint resource allocation viable at the central controller. In addition, since the period of slow-timescale resource allocation is much longer than the channel coherence time, the average channel conditions can be accurately modeled and measured using path loss and the statistics of small scale fading. The frequency resources are assumed to be homogeneous on a slow timescale. Given spectrum resource of bandwidth W Hertz (Hz), the task of the central controller is to determine which spectrum segment(s) to allocate to each AP-UE link in order to maximize the long-term network utility.

The set of AP indexes is denoted by $N=\{1, \ldots, n\}$ and the set of UE indexes is denoted by $K=\{1, \ldots, k\}$. Arbitrary association is allowed such that each AP can simultaneously serve any subset of UEs and each UE can be simultaneously served by any subset of APs. Furthermore, flexible resource allocation is allowed in that each AP-UE link can use an arbitrary (possibly discontinuous) parts of the transmission spectrum.

A key aspect of total spectrum agility is the notion of the pattern, which as discussed above, refers to a subset of APs (i.e., a subset of transmitters). A resource is said to be reserved for pattern A if the resource is to be shared by transmitters in A. As discussed herein, resources can refer to frequency resources. However, the present system and method can be generalized to time, frequency, and/or other resources such as spatial resources. In the downlink, a pattern A is a subset of N, and APs in A are allowed simultaneous access to the frequency bands reserved for pattern A. The pattern uniquely determines the interference condition and henceforth also the efficiency of every AP-UE link under the pattern. There are $2^n$ distinct patterns in total, including the empty one. Because the spectrum is regarded as homogeneous on the timescale of interest, the spectrum allocation problem can be formulated as how to divide the spectrum among all $2^n$ patterns. As an example illustrated in FIG. 4, if there are three APs the spectrum can be divided into $2^3-1=7$ segments. One segment is used by AP 1 exclusively (the pattern is $\{1\}$), a second is used by AP 2 exclusively (the pattern is $\{2\}$), a third is used by AP 3 exclusively (the pattern is $\{3\}$), and the remaining four segments include three shared by the pairs of APs (the patterns are $\{1,2\}$, $\{2,3\}$, and $\{1,3\}$, respectively), as well as one segment shared by all three APs (the pattern is $\{1,2,3\}$).

The notion of the pattern is related to the concept of an independent set defined in the special case where the network is described by a weighted/unweighted conflict graph. In a conflict graph, since adjacent links cannot succeed simultaneously, it suffices to schedule only patterns corresponding to independent sets. The classical problem is to find independent sets of links that maximize the network utility. It is assumed herein that nearby links cause soft interference rather than hard conflict. The solution space therefore consists of all $2^n$ patterns, and as shown below the optimal solution consists of a very small subset of patterns.

The allocation problem can be divided into the following two subproblems. The first allocation subproblem is to allocate bandwidths to all $2^n$ patterns, denoted by a $2^n$-dimensional vector: $y=(y^A)_{A \subset N}$, where $y^A \in [0,1]$ is the fraction of bandwidth shared by APs in A. It follows that:

$$\sum_{A \subset N} y^A = 1. \qquad \text{Eq. 1}$$

An efficient allocation allocates no resource to the empty pattern, yielding $y^\emptyset=0$. For every pattern $A \subset N$, every AP in A divides the spectrum reserved for A to serve all its associated UEs using orthogonal spectrum segments, which is the second allocation subproblem. The bandwidth allocated to the link $i \to j$ (the link from AP i to UE j) over pattern A is denoted as $w_{i \to j}^A$. Consequently, $$\sum_{j \in K} w_{i \to j}^A \le y^A, \forall A \subset N, i \in A. \qquad \text{Eq. 2}$$

Figure 4:
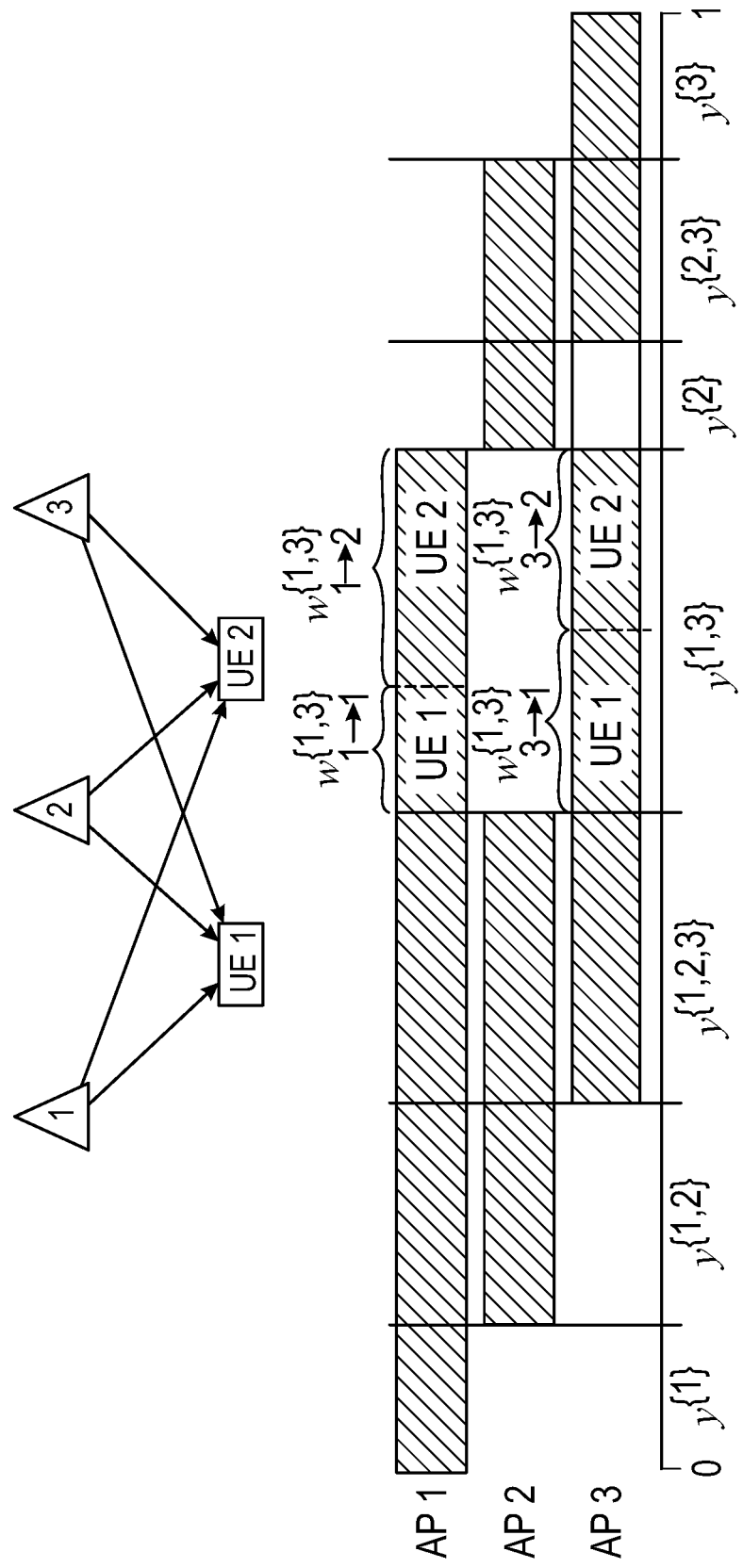
FIG. 4 depicts all patterns of a 3 AP, 2 UE network in accordance with an illustrative embodiment.

As $w_{i \to j}^A$ is only defined for $i \in A$, the result is exactly $kn2^{n-1}$ such variables. Although the y variables specify the pattern bandwidths only, they directly imply a physical allocation as depicted in FIG. 4, which depicts all patterns of a 3 AP, 2 UE network in accordance with an illustrative embodiment. The allocations to the 2 UEs are revealed under pattern $\{1, 3\}$. Finer allocation to AP-UE links is then straightforward. As illustrated in FIG. 4, a physical spectrum allocation can be easily assembled from the set of w variables satisfying Eq. 1 and Eq. 2. Also, UE j is associated to AP i if and only if $w_{i \to j}^A > 0$ for some pattern A with $i \in A$.

For simplicity, it is assumed that each AP applies a flat power spectral density (PSD) over the allocated spectrum. The spectral efficiency of link $i \to j$ over pattern A is denoted by $s_{i \to j}^A$. It suffices to define $s_{i \to j}^A$ only for $i \in A$ as $s_{i \to j}^A$ is not used with $i \notin A$ in problem formulations. To preempt any concern, the following relation is used:

$$s_{i \to j}^A = 0, \forall i \in N \backslash A. \qquad \text{Eq. 3}$$

Usually, the exclusive spectrum has higher spectral efficiency than shared spectrum. In general, $s_{i \to j}^A \ge s_{i \to j}^B$ if $\in A \subset B$. The spectral efficiency $s_{i \to j}^A$ can either be calculated based on path loss and other impairments or be measured over time. For concreteness in obtaining numerical results, Shannon's formula is used for the link efficiencies:

$$s_{i \to j}^A = \frac{W}{L} 1(i \in A) \log_2 \left( 1 + \frac{p_i g_{i \to j}}{n_0 + \sum_{l \in A: l \ne i} p_l g_{l \to j}} \right) \text{ packets/s}, \qquad \text{Eq. 4}$$

where L is the average packet length in bits, $p_i$ is the transmit PSD of AP i, $n_0$ is the noise PSD, $g_{i \to j}$ is the gain of link $i \to j$ which captures the effects of path loss and shadowing, $\sum_{l \in A: l \ne i} p_l g_{l \to j}$ is the interference received from other APs operating over the same pattern A, and the indicator function is defined as $$1(a) = \begin{cases} 1 & \text{if a holds,} \\ 0 & \text{if a does not hold.} \end{cases} \qquad \text{Eq. 5}$$

The link efficiency is normalized using factor W/L so that the units of $s_{i \to j}^A$ are packets/second. The service rate to UE j contributed by AP $i \in A$ over pattern A is $s_{i \to j}^A w_{i \to j}^A$. The total service rate of UE j denoted as $r_j$ can be calculated by summing over all APs over all patterns as follows:

$$r_j = \sum_{A \subset N} \sum_{i \in A} s_{i \to j}^A w_{i \to j}^A. \qquad \text{Eq. 6}$$

The basic problem formulation is now described. The fundamental problem is to maximize the long-term utility by adapting the user association and multi-pattern resource allocation. Collecting the constraints of Eqs. 1, 2, and 6, P0 is formulated as:

P0a: maximize$_{r,w,y}$ u(r)

P0b: subject to $r_j = \sum_{A \subset N} \sum_{i \in A} s_{i \to j}^A w_{i \to j}^A, \forall j \in K$ P0c: $\sum_{j \in K} w_{i \to j}^A \leq y^A, \forall A \subset N, \forall i \in A$ P0d: $\sum_{A \subset N} = 1,$ P0e: $w_{i \to j}^A \geq 0, \forall j \in K, \forall A \subset N, \forall i \in A$ where u(r) is the network utility function, and $y=(y^A)_{A \subset N}$ and $w=(w_{i \to j}^A)_{j \in K, A \subset N, i \subset A}$ represent the bandwidth allocations. The spectral efficiencies $(s_{i \to j}^A)_{j \in K, A \subset N, i \in A}$ are known parameters. Because the rate vector $r=[r_1, \ldots, r_k]$ is a linear transformation of the allocation vector w through P0b, the utility can be expressed directly as a function of the allocations: u(r(w)).

The P0 is a convex optimization problem as long as u(r) is concave in r. The sum rate, the minimum user service rate (max-min fairness), and the sum log-rate (proportional fairness) are all concave utility functions. The focus herein is on the average (negative) packet delay as the network utility function:

$$u(r) = -\sum_{j \in K} \frac{\lambda_j}{(r_j - \lambda_j)^+}, \quad \text{Eq. 7}$$

where $\lambda_j$ is the homogeneous Poisson packet arrival rate of UE j, and the extended real-valued function $1/x^+=1/x$ if $>0$ and $1/x^+=+\infty$ if $x \leq 0$. It can be seen that $1/x^+$ is convex on $(-\infty, +\infty)$. The choice of this utility function also assumes exponential packet length and a conservative rate. If $r_j \leq h_j$, the packet delay is infinite, the system becomes unstable.

Theorem 1: There exists an optimal solution to P0 with at most k active patterns, i.e., the optimal solution satisfies:

$$|\{A \subset N | y^A > 0\}| \leq k. \quad \text{Eq. 8}$$

In addition, if the coefficients $s_{i \to j}^A$ are drawn from a jointly continuous distribution, then, with probability 1, there are at most n−1 UEs served by multiple APs in every optimal solution to P0. That is, the optimal solution satisfies:

$$|\{j \in K | \text{ there exist } A_1, A_2 \subset N, i_1 \in A_1, i_2 \in A_2 \quad \text{Eq. 9}$$
$$\text{that satisfy } i_1 \neq i_2 \text{ and } w_{i_1 \to j}^{A_1}, w_{i_2 \to j}^{A_2} > 0\}| \leq n - 1.$$

The above Theorem 1, which has been proven, guarantees that although the total number of patterns grows exponentially with the number of APs in the network, using a small number of patterns achieves the optimal performance. Furthermore, it states that although we allow a UE to be served by multiple APs, most UEs will be associated with only one AP in the optimal solution.

Proposition 1: If the utility function u(r(w)) is affine in w, then the maximum utility in P0 can be attained by a single active pattern, where each AP serves only one UE. This proposition is proven below. A simple example for an affine utility function u(r(w)) is the weighted sum rate function. The above Proposition 1 admits a simple intuition: The utility is contributed by a weighted sum of the bandwidths allocated to all links over all patterns, so shifting all resources to a dominant pattern does not reduce the utility.

A scalable model and algorithm are now described. There are $kn2^{n-1}+2^n+k$ variables in P0. P0 can be solved using a standard convex optimization solver for networks with a small number of APs. For a metropolitan area network consisting of hundreds or even thousands of APs, the space and time complexities of P0 become prohibitive. By first dividing the network into many small clusters, one may solve for allocation in each cluster separately by assuming away the uncertainties about inter-cluster interference. However, because interference from outside a cluster can penetrate deeply into a cluster, such divide-and-conquer solutions suffer significant loss. It is also noted that any distributed solution is necessarily myopic and hence suffers similar loss. Thus, the network is treated in its entirety to develop a scalable, equivalent reformulation and an efficient near-optimal method for solving the new optimization problem is provided.

In a large network with many APs, a UE can in general only be served by a small subset of nearby APs due to path loss. For every $j \in K$, let $N_j$ denote the set of APs whose received signal-to-noise ratios at UE j are above a certain threshold $\xi$, i.e., $$N_j \equiv \{i \in N | \frac{p_i g_{i \to j}}{n_0} > \xi\}. \quad \text{Eq. 10}$$

$N_j$ is referred to as the neighborhood of UE j. UE j treats all APs outside $N_j$ as stationary noise sources. This can be arbitrarily precise as $N_j$ may be defined to include all APs except those received by UE j at well below the noise level. It is fair to assume the size of all neighborhoods are upper bounded by a constant $c_0$, i.e., $|N_j| \leq c_0, \forall j \in K$. The choices of $\xi$ of and $c_0$ in the actual numerical examples are discussed below.

Figure 5:
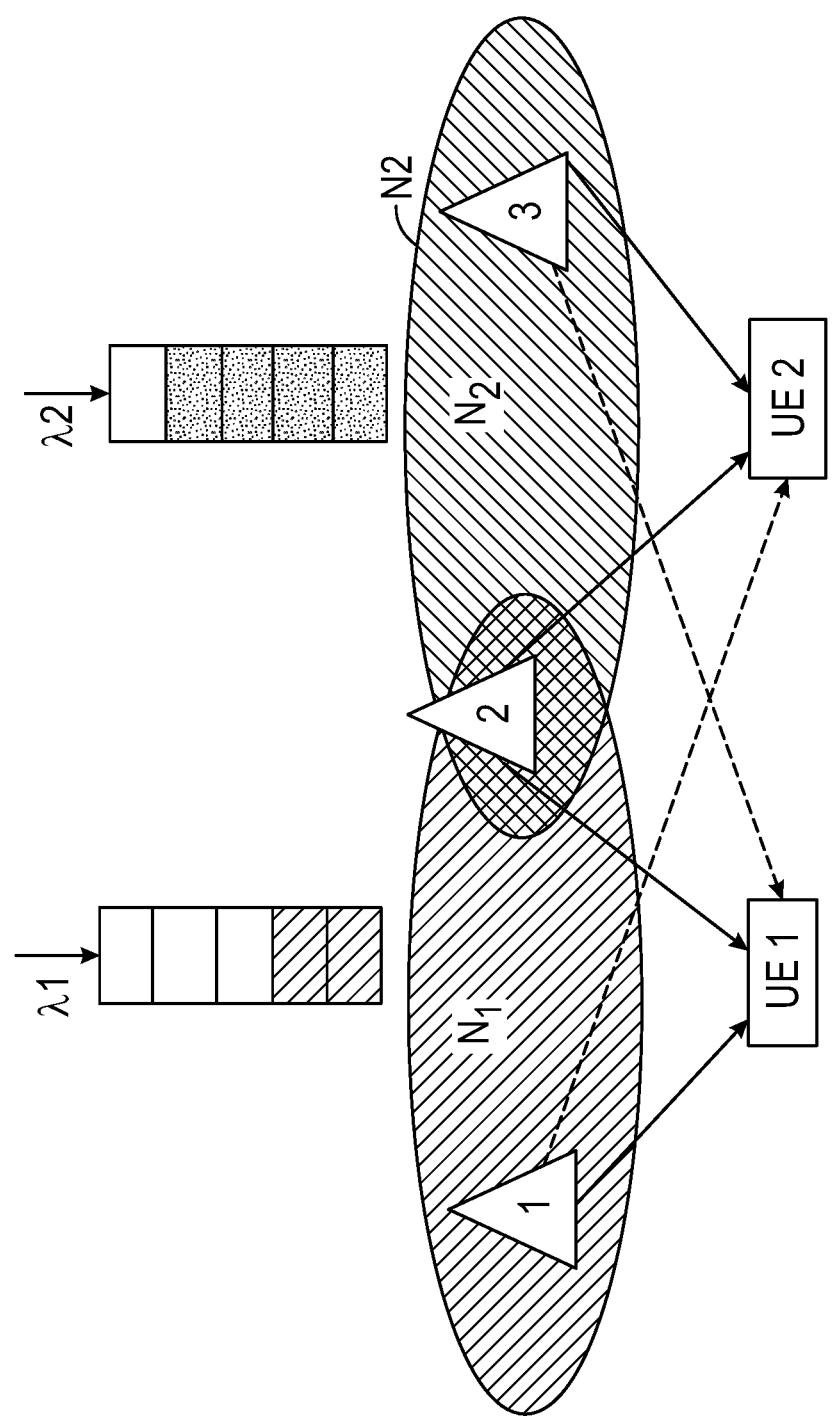
FIG. 5 depicts a toy network example with 3 APs and 2 UEs in accordance with an illustrative embodiment.

FIG. 5 depicts a toy network example with 3 APs and 2 UEs in accordance with an illustrative embodiment. Here the neighborhood of UE 1 is {1,2} since AP 3 is far away from UE 1, making the received power from AP 3 below the threshold $\xi$. Similarly, the neighborhood of UE 2 is {2,3}. Neighborhood $N_1$ can be thought of as a server of UE 1's traffic. The preceding assumptions imply that the efficiency of link i→j can be nonzero only if i∈$N_j$, and if so, it only depends on the activities of APs in the neighborhood of UE j. That is, $$s_{i \to j}^A = s_{i \to j}^{A \cap N_j} 1(i \in A \cap N_j) \quad \text{Eq. 11}$$

for all j∈K, A∈N, and i∈A. This is consistent with Eq. 3.

For every j∈K, all subsets of $N_j$ constitute the set of local patterns of UE j. A new set of allocation variables $(x_{i \to j}^B)$ are adopted, where for every j∈K, $x_{i \to j}^B$ is only defined for B⊂$N_j$ and i∈B. Here, $x_{i \to j}^B$ denotes the bandwidth allocated to link i→j under the local pattern B, which can be obtained as:

$$x_{i \to j}^B = \sum_{A \cap N: A \cap N_j = B} w_{i \to j}^A \forall j \in K, B \subset N_j, i \in B. \quad \text{Eq. 12}$$

That is, it is the sum bandwidth over all global patterns that match B in the neighborhood of UE j. There are exactly $$\sum_{j \in K} |N_j| 2^{|N_j|-1} \leq k c_0 2^{c_0 - 1}$$

such x variables. From the viewpoint of UE j, $(x_{i \to j}^B)_{B \subset N_j, i \in B}$ describes how much bandwidth is allocated to all its associated links over all its local patterns. Using Eqs. 11 and 12, the summation in P0b can be written as:

$$r_j = \sum_{A \cap N} \sum_{i \in K} s_{i \to j}^A w_{i \to j}^A \quad \text{Eq. 13}$$

$$= \sum_{A \cap N_i \in A \cap N_j} \sum s_{i \to j}^{A \cap N_j} w_{i \to j}^A \quad \text{Eq. 14}$$

$$= \sum_{B \cap N_j} \sum_{i \in B} s_{i \to j}^B \sum_{A \cap N : A \cap N_j = B} w_{i \to j}^A \quad \text{Eq. 15}$$

$$= \sum_{B \cap N_j} \sum_{i \in B} s_{i \to j}^B x_{i \to j}^B. \quad \text{Eq. 16}$$

In Eq. 16, only local spectrum allocations $x_{i \to j}^B$ with $i \in B \subset N_j$ are used. Therefore, as substitutes of $k n 2^{n-1}$ (global) w variables, at most $c_0 2^{c_0-1} = O(1)$ local x variables are involved in Eq. 16 for a given j. This is sufficient as the sum over $B \subset N_j$ and exhausts all patterns of APs that may serve UE j.

As noted in the theorem above, there exists an optimal solution to P0 that activates at most k patterns. Therefore, the local allocation variables x should fit into k segments, where each segment represents the allocation of one pattern. The set of all segment indexes is denoted by $L = \{1, \ldots, k\}$. By introducing replicas of the x variables in the form of $(x_{i \to j}^{A,l})_{j \in K, l \in L, i \in A \subset N_j}$, there is obtained an equivalent reformulation of P0, referred to as P1:

$$\text{maximize}_{r,x,d,h} u(r) \quad \text{P1a}$$

$$\text{subject to } r_j = \sum_{A \subset N_j} \sum_{i \in A} s_{i \to j}^A \sum_{l \in L} x_{i \to j}^{A,l}, \forall j \in K \quad \text{P1b}$$

$$x_{i \to j}^{A,l} \leq d_j^{A,l}, \forall j \in K, \forall l \in L, \forall A \subset N_j, \forall i \in A \quad \text{P1c}$$

$$d_j^{A,l} + \sum_{\substack{B \subset N_m: \\ B \cap N_j \neq A \cap N_m}} d_m^{B,l} \leq 1, \forall l \in L, \forall j \in K, \quad \text{P1d}$$

$$\forall A \subset N_j, \forall m \in K : N_m \cap N_j \neq \emptyset,$$

$$\sum_{j \in K : i \in N_j} \sum_{A \subset N_j : i \in A} x_{i \to j}^{A,l} \leq h^l, \forall i \in N, \forall l \in L \quad \text{P1d}$$

$$\sum_{l \in L} h^l \leq 1, \quad \text{P1f}$$

$$d_j^{A,l} \in \{0, 1\}, \forall l \in L, \forall j \in K, \forall A \subset N_j \quad \text{P1g}$$

$$x_{i \to j}^{A,l} \geq 0, \forall l \in L, \forall j \in K, \forall A \subset N_j, \forall i \in A. \quad \text{P1h}$$

In P1, the spectrum is divided to k segments with bandwidths $h^1, \ldots, h^k$, each corresponding to a global pattern.

For the l-th segment, the variables $(x_{i \to j}^{A,l})_{j \in K, i \in A \subset N_j}$ and $(d_j^{A,l})_{j \in K, A \subset N_j}$ represent the allocation of this segment from all UEs' viewpoints. Here P1b corresponds to Eq. 16. P1c implies that $d_j^{A,l}$ is the indicator of local pattern A from UE j's viewpoint over the l-th segment, i.e., $d_j^{A,l} = 1$ if there exists $i \in N_j$ such that $x_{i \to j}^{A,l} > 0$; otherwise $d_j^{A,l} = 0$. P1d constrains the consistency of allocation over each segment among all UEs. That is, P1d enforces the allocation of no more than one pattern over segment l from every UE's viewpoint. Compared with P0 which has $O(kn2^n)$ variables, the number of variables in P1 is $$k \sum_{j \in K} (|N_j| + 2) 2^{|N_j|-1} + 2k = O(k^2). \quad \text{Eq. 17}$$

Theorem 2: P0 and P1 are equivalent in the sense that they achieve the same utility with identical rate vector(s). Moreover, given the optimal solution to P1, the patterns and bandwidths of the optimal solution to P0 can be obtained as:

$$A_l = \bigcup_{j \in K} \bigcup_{B \subset N_j : d_j^{B,l} > 0} B, \forall l \in L \quad \text{Eq. 18}$$

$$w_{i \to j}^{A_l} = x_{i \to j}^{A \cap N_j}, \forall l \in L, \forall j \in K, \forall i \in A_l. \quad \text{Eq. 19}$$

Theorem 2 is proven below. The following result is a useful building block for an efficient algorithm for solving P1 to arbitrary precision.

Proposition 2: Suppose that $u(r(x))$ is an affine function of x. In terms of the maximum utility and the set of feasible (x, d), P1 is equivalent to P2:

$$\text{maximize}_{x,d} u(r(x)) \quad \text{P2a}$$

$$\text{subject to } x_{i \to j}^A \leq d_j^A, \forall j \in K, \forall A \subset N_j, \forall i \in A \quad \text{P2b}$$

$$d_j^A + \sum_{\substack{B \subset N_m: \\ B \cap N_j \neq A \cap N_m}} d_m^B \leq 1, \forall j \in K, \forall A \subset N_j, \quad \text{P2c}$$

$$\forall m \in K : N_m \cap N_j \neq \emptyset,$$

$$\sum_{j \in K : i \in N_j} \sum_{A \subset N_j} x_{i \to j}^A \leq 1, \forall i \in N \quad \text{P2d}$$

$$d_j^A \in \{0, 1\}, \forall j \in K, \forall A \subset N_j \quad \text{P2e}$$

$$x_{i \to j}^A \in \{0, 1\}, \forall j \in K, \forall A \subset N_j, \forall i \in A. \quad \text{P2f}$$

The key point of Proposition 2 is that when the utility function $u(r(x))$ is affine in x, the optimal solution to P1 activates only one pattern and each AP serves one UE that benefits the most, which yields a simplified formulation P2 (there is no need for the replica index l). More importantly, P2 is a binary linear program (BLP) with only $O(k)$ variables.

Although the mixed integer programming P1 has significantly fewer variables than the original problem P0 for a large network, it is non-deterministic polynomial-time hard (NP-hard) in general. It is at least as hard to compute the performance gap between an approximation of P1 and the global optimal. The gap can, however, be upper bounded by optimizing an upper bound of the utility function. A promising technique is then to iteratively optimize local linear expansions of the concave utility function. In fact, because the expansion in each step must be an affine upper bound, each step becomes a linear program.

For ease of notation, $\Lambda$ is denoted as the feasible region in terms of x defined by P2b-P2f and $v(x)=u(r(x))$ denotes the concave utility function. The $\nabla v(x)$ is used to denote the gradient of $v(\cdot)$. Specifically, if $v(\cdot)$ is differentiable at x, $$[\nabla v(x)]^A_{i\to j} = \frac{\partial v(x)}{\partial x^A_{i\to j}}, \forall j \in K, A \subset N_j, i \in A. \quad \text{Eq. 20}$$

If $v(\cdot)$ is not differentiable at x, $\nabla v(x)$ is minus subgradient of the convex function $-v(\cdot)$. For every q, $x \in \Lambda$, it is noted that $$f_q(x) = v(q) + \langle \nabla v(q), x-q \rangle \quad \text{Eq. 21}$$

where the inner product is defined in general as $$\langle x, z \rangle = \sum_{j \in K} \sum_{A \subset N_j} \sum_{i \in A} x^A_{i \to j} z^A_{i \to j}. \quad \text{Eq. 22}$$

Due to its concavity, $v(\cdot)$ must be upper bounded by its linear expansion:

$$v(x) \leq f_q(x), \forall x \in \Lambda. \quad \text{Eq. 23:}$$

Given a fixed feasible point q, one obtains an upper bound of the global maximum if u(r) is replaced in (P1a) by $f_q(x)$. Since $f_q(\cdot)$ is affine, the above proposition implies that a unique pattern can be identified to maximize the affine approximation. Based on this observation, Algorithm 1 is proposed, which is an iterative pattern-pursuit algorithm for finding a solution within any given $\epsilon > 0$ from the global optimum. Algorithm 1 is as follows:

Input: $\epsilon > 0$.
Output: $x^{(t)}$.
Initialization: $t \leftarrow 0$; $P \leftarrow \emptyset$; pick an arbitrary pattern $x^{(0)}$.
Repeat
Step 1. Compute x and d which maximize $\langle \nabla v(x^{(t)}), x \rangle$ subject to constraints (P2b)-(P2f).
Step 2. $t \leftarrow t+1$. If $d \notin P$, $P \leftarrow P \cup \{d\}$ otherwise, add an arbitrary new pattern that is not in P.
Step 3. Solve P1 by restricting to patterns in P and obtain the optimal allocation solution $x^{(t)}$.

until $\text{maximize}_{x \in V} \langle \nabla v(x^{(t)}), x - x^{(t)} \rangle \leq \epsilon$.

Algorithm 1 can be interpreted as a Frank-Wolfe type Algorithm (also known as a conditional gradient algorithm). The main difference from a conventional algorithm is that instead of doing line search, Algorithm 1 finds one recommended pattern in each iteration and re-optimizes P1 using the set of recommended patterns identified so far. The recommended pattern set P grows after each iteration because either one recommended pattern is found or a random new pattern is added. In the worst case, Algorithm 1 takes no more than $2^n$ steps to terminate, because when the number of patterns in P reaches $2^n$, $x^{(t)}$ must be globally optimal, so that the condition to exit the loop must be met. As shown in the numerical example below with 1000 APs and 2500 UEs, it takes only about 50 steps to achieve an optimality gap of less than 7%.

Algorithm 1 has several important features. The algorithm has recommended pattern pursuit since Algorithm 1 starts with the full-spectrum-reuse pattern in which all APs occupy the entire spectrum. In each iteration, it identifies one best pattern as the maximizer of this linear function (taken over the same domain). Due to the Theorem 1 discussed above, it usually takes no more than k iterations to find the global optimum. The algorithm is also efficient in that the Step 1 solves a BLP in the form of P2. Althought BLP is NP-complete in the worst case, many BLPs with sparse structure can be solved efficiently. As observed from numerical results, Step 1 takes a fairly small amount of time. In particular, if a branch and bound/cut method is used, the BLP step can be terminated as soon as a sufficiently tight upper bound is reached.

Additionally, Algorithm 1 has an optimality guarantee as stated in Theorem 3: Suppose Eq. 11 holds. For every $\epsilon > 0$, there exists a positive integer k such that $v(x^{(k)})$ is at most $\epsilon$ away from the global optimum of P0.

Theorem 3 is proven in that P1 is always re-optimized using more patterns than previous iterations, which results in non-decreasing series of the utility $(v(x^{(t)}))_{t=0,1,...}$. This series must converge due to boundedness of the utility function. Let x* denote the global optimal. By Eqs. 21 and 23, it follows that:

$$v(x^*) - v(x^{(t)}) \leq \langle \nabla v(x^{(t)}), x^* - x^{(t)} \rangle. \quad \text{Eq. 24}$$

Therefore, when the condition for terminating the loop in Algorithm 1 is satisfied, the optimality gap $v(x^*) - v(x^{(k)})$ is guaranteed to be less than $\epsilon$.

To obtain numerical results, parameters compliant with the LTE standard were used. These parameters are depicted in the table set forth as FIG. 6 in accordance with an illustrative embodiment. The maximum number of potential associations of a user is set as $c_0=3$. The results for the actual packet delay are obtained using a packet-level simulator, which adapts the transmission time of each packet to the instantaneous active APs that are transmitting. It is noted that the delay of a packet includes its transmission time and its waiting time in the queue. The performance gain of the proposed allocation schemes were investigated by comparing them with the following baseline schemes: 1. Full-spectrum-reuse+maximum reference signal receive power (MaxRSRP): Every AP reuses all available spectrum and every UE is associated to the strongest AP in terms of the received power. 2. Full-spectrum-reuse+optimal user association: Every AP reuses all available spectrum and user association is optimized for the utility. 3. A coloring algorithm. 4. Optimal lower bound: The optimal lower bound of P0 obtained through Algorithm 1.

Figure 7:
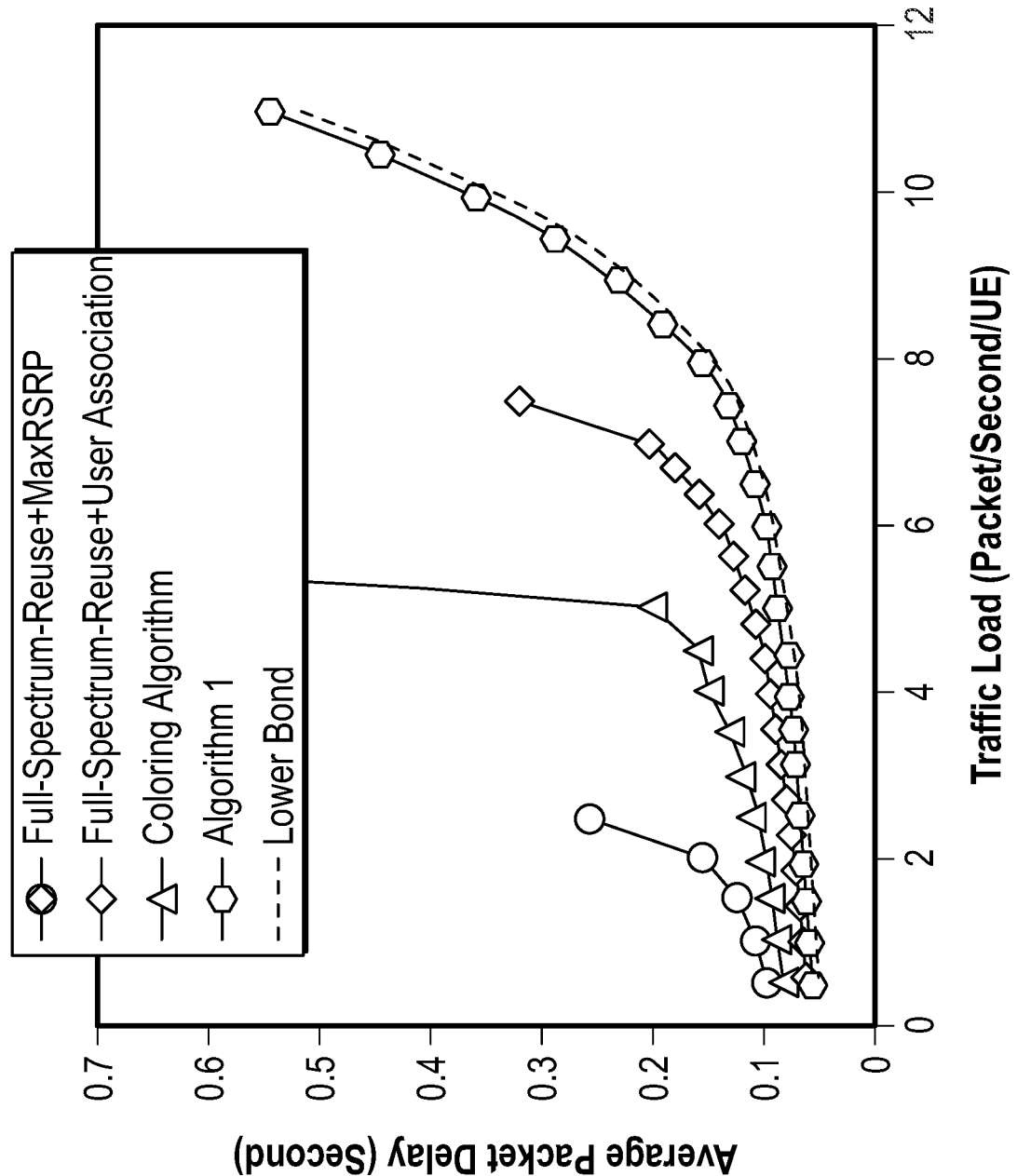
FIG. 7 is a comparison of results of the present scheme with baseline schemes in accordance with an illustrative embodiment.

The performance of the proposed scheme was first considered in medium-size networks, in which 100 APs and 200 UEs were randomly dropped over a 1100×1100 $m^2$ area. The average packet delay versus traffic intensity curves are shown in FIG. 7, which is a comparison with the baseline schemes in accordance with an illustrative embodiment. As the average UE traffic increases to above 7.5 packets/second, all three baseline schemes fail to support all the UEs. Conversely, the proposed solution has significantly larger throughput (above 11 packets/second) than the other schemes. The proposed solution also significantly reduces the delay especially in the high traffic regime. The reason is that the proposed solution adapts to the traffic conditions such that spectrum is more reused more aggressively in the low traffic regime, and spectrum use is more orthogonalized to avoid mutual interference. Furthermore, the curve of the lower bound of the optimum is quite close to the curve of the proposed scheme. This means the proposed solution is close to the global optimum of P0.

The present system and method were also tested in a large network. Specifically, the proposed scheme was used to compute near-optimal allocation for a network consisting of 1000 APs and 2500 UEs over a 4200×4200 m² area. Since the coloring algorithm can not afford the computation in such large scale network, proposed scheme was compared with the first two baseline schemes.

Figure 8:
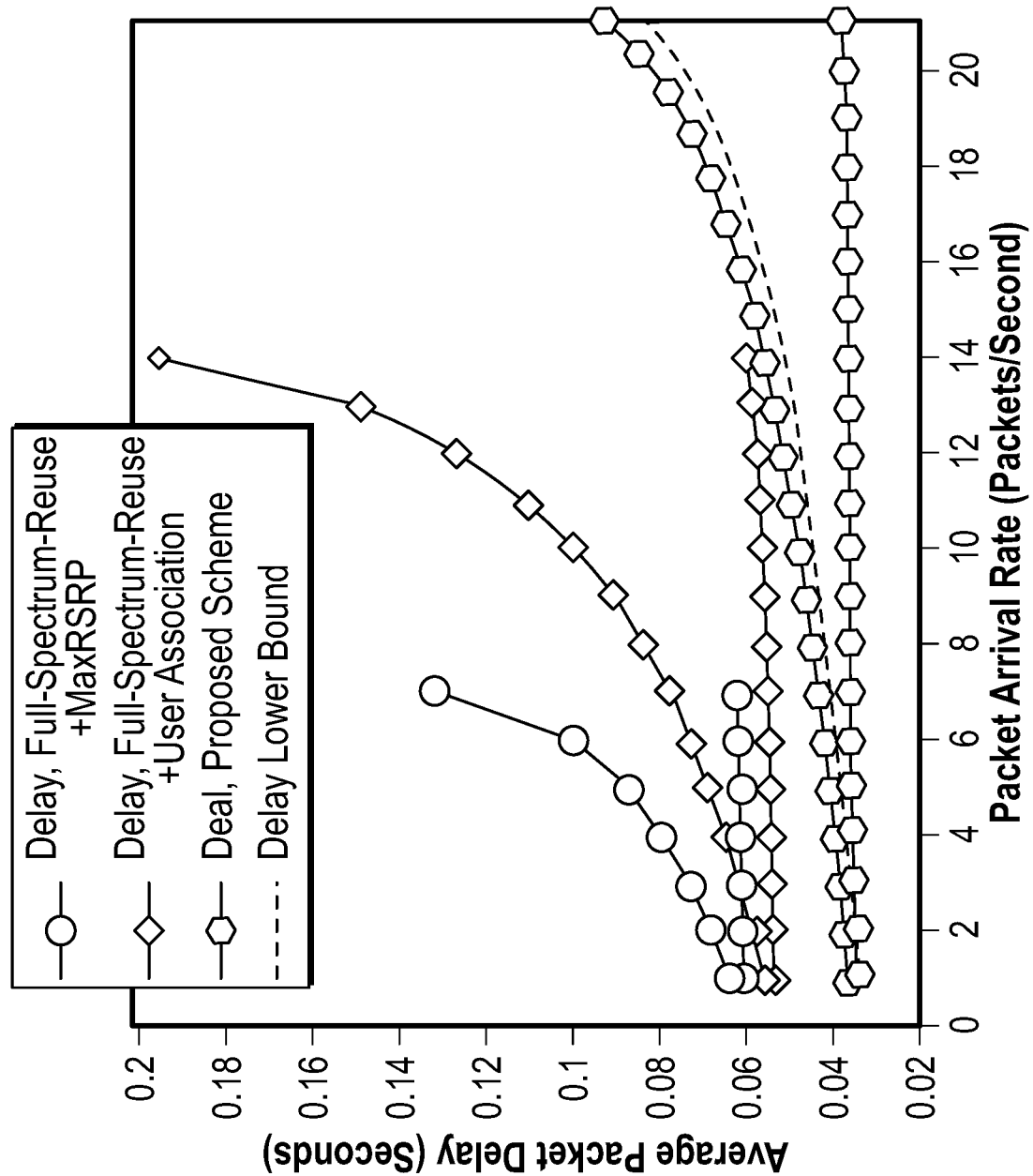
FIG. 8 is a diagram depicting the average packet delay versus packet arrival rate in accordance with an illustrative embodiment.

The average packet delay versus packet arrival rate are shown in FIG. 8 in accordance with an illustrative embodiment. In FIG. 8, each dotted curve represents the average transmission time of the corresponding delay curve with identical marker and color. The proposed solution has significantly larger throughput (above 21 packets/second) than full-spectrum reuse with maxRSRP association (7 packets/second) and full-spectrum reuse with optimal user association allocation (14 packets/second). The proposed solution also outperforms other schemes in delay especially in the high traffic regime. Furthermore, the proposed solution is near optimal with less than 7% gap. Besides, compared with delay, the transmission time increases much more slowly with traffic load, indicating that the spectrum is efficiently allocated to mitigate interference among APs.

Figure 9A:
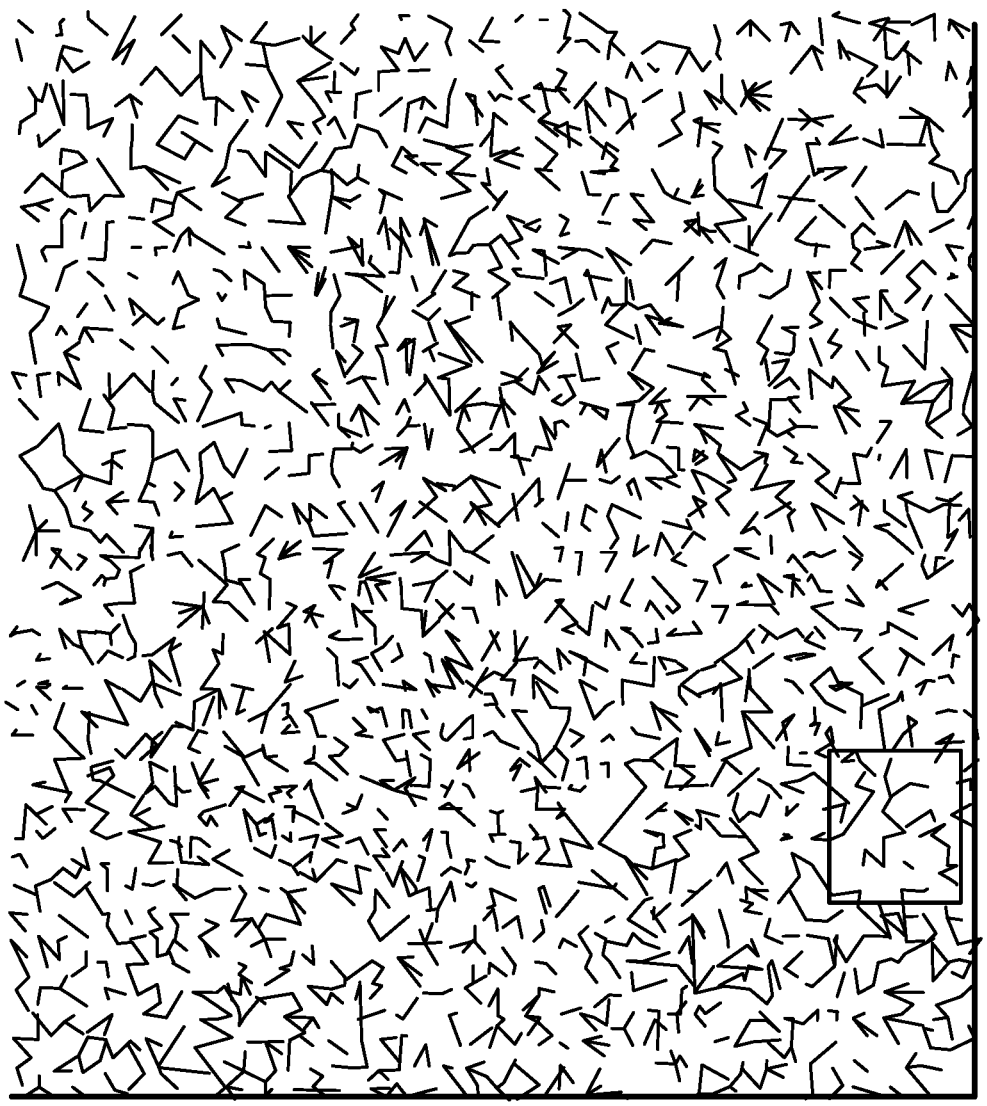
FIG. 9A depicts a deployment and user association for a large network in accordance with an illustrative embodiment.
Figure 9B:
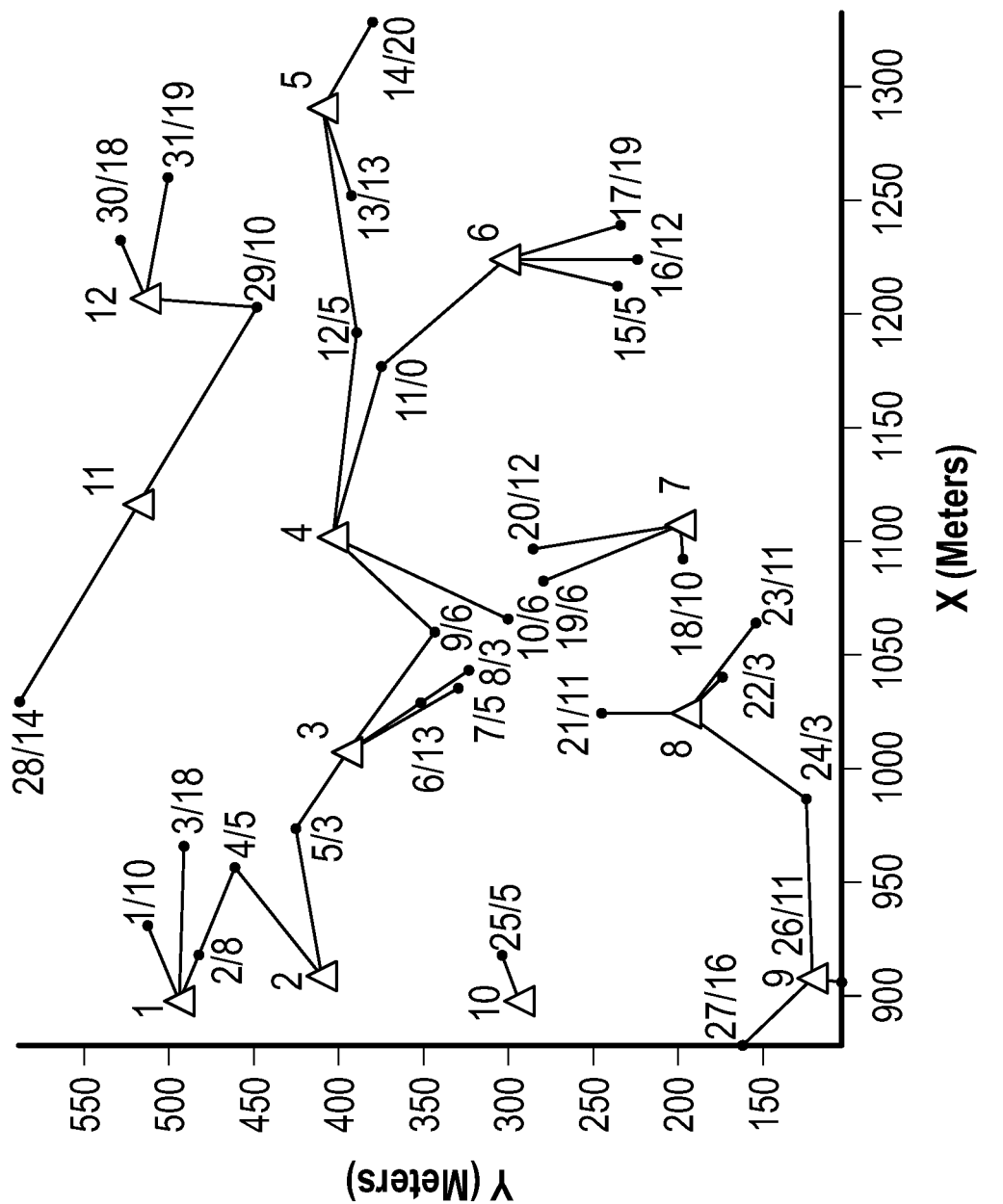
FIG. 9B is a topology graph corresponding to the marked area in FIG. 9A in accordance with an illustrative embodiment.
Figure 9C:
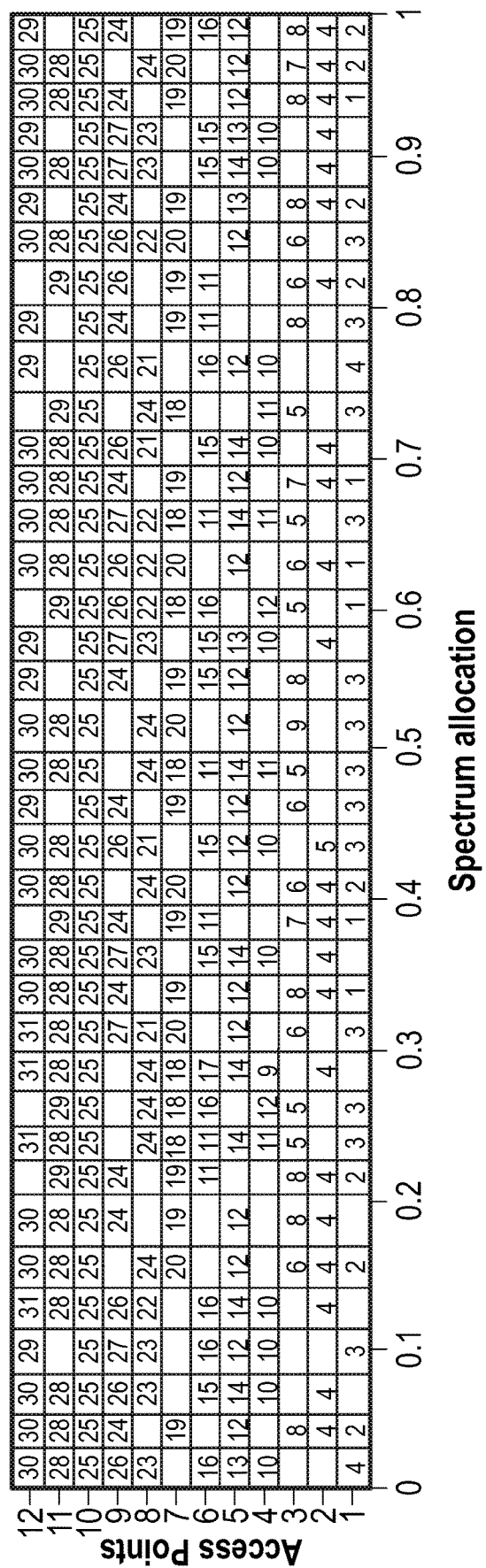
FIG. 9C is an allocation graph corresponding to the marked area in FIG. 9A in accordance with an illustrative embodiment.

The obtained spectrum allocation and user association at average per UE packet arrival rate of 20 packets/second is shown in FIGS. 9A-9C. FIG. 9A depicts a deployment and user assoication for a large network in accordance with an illustrative embodiment. FIG. 9B is a topogology graph corresponding to the marked area in FIG. 9A in accordance with an illustrative embodiment. FIG. 9C is an allocation graph corresponding to the marked area in FIG. 9A in accordance with an illustrative embodiment. As shown in FIG. 9A, the lines connecting each UE-AP pair indicate an association. FIG. 9B shows the user association for the marked area. The numbers above each UE represent the UE index and its traffic load, respectively. The number above each AP represents the AP index. The spectrum allocation for the marked area is shown in FIG. 9C. The widths of the rectangles represent fractions of the entire spectrum of the active patterns. The solid ones in each row are the spectrum segments that are used by the corresponding AP to serve the UE whose index is marked on that spectrum segment. The algorithm achieves topology aware frequency reuse for interference management, as well as an efficient traffic aware spectrum allocation. Specifically, strongly interfering links (e.g., link 2→4 and link 3→5) are assigned different spectrum segments, and the same spectrum segments are reused by two links that are far apart (e.g., link 10→25 and link 11→28). Moreover, UEs with light traffic loads or UEs on the transmission edge of two APs (e.g., UE 5) are assigned less spectrum, and vice versa.

Figure 10:
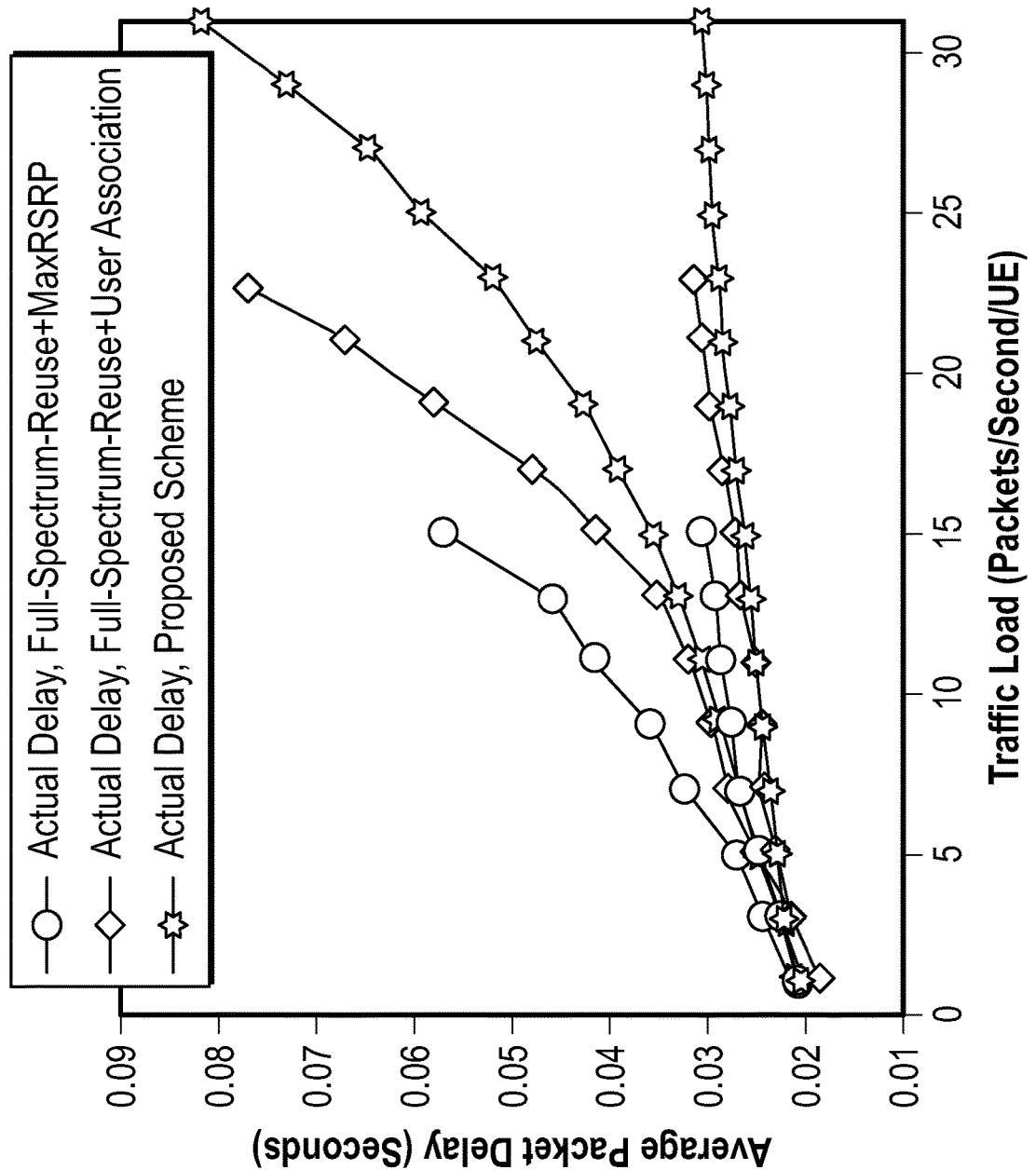
FIG. 10 is a graph that compares the actual average packet delay of the proposed allocation scheme with the baseline schemes in accordance with an illustrative embodiment.

To compare the theoretical delay with the actual delay, a packet-level simulator is used. The actual transmission rate of a resource reserved for a pattern depends on the actual set of busy APs, which is a subset of the pattern. FIG. 10 is a graph that compares the actual average packet delay of the proposed allocation scheme with the baseline schemes in accordance with an illustrative embodiment. In FIG. 10, each dotted curve represents the average transmission time of the corresponding delay curve with in accordance with the legend. Compared with the theoretical results in FIG. 8, all three schemes achieve larger throughput regions. That is because the service rate model of Eq. 6 is conservative, i.e., an AP's transmission rate over any spectrum segment is the worst-case rate under the corresponding pattern, which is the achievable rate when all APs in the pattern are transmitting. This also explains the fact that the proposed scheme is not as good as the second baseline scheme in the low traffic regime. But the proposed scheme still achieves a quite larger throughput (31 packets/second/UE) than the other schemes. Moreover, the delay is also significantly reduced by about 50% in the high traffic regime.

Thus, the systems and methods described herein effectively address the joint user association and spectrum allocation problem in large networks over a slow timescale. A highly scalable reformulation of the network utility maximization problem has been developed, and a pattern pursuit algorithm is proposed which obtains near-optimal solution with an optimality guarantee. As discussed above, the numerical results show substantial gains compared to all the other baseline schemes for networks with a large number of access points. The proposed algorithm applies to any concave utility functions such as sum rate, minimum user service rate (max-min fairness) and sum log-rate (proportional fairness).

Proof of Proposition 1:

The affine utility function can be written as $$u(r(w)) = d + \sum_{j \in K} \sum_{A \subset N} \sum_{i \in A} c^A_{i \to j} w^A_{i \to j} \qquad \text{Eq. 25}$$

for some constants d and $(c^A_{i \to j})$. Then P0 can be rewritten as:

$$\text{maximize}_{y^A \geq 0, \sum_{A \subset N} y^A = 1} \qquad \text{Eq. 26}$$

$$\text{maximize}_{w^A_{i \to j} \geq 0, \sum_{l \in K} w^A_{i \to l} \leq y^A \, \forall j \in K, \forall A \subset N,}$$

$$\forall i \in A \sum_{j \in K} \sum_{A \subset N} \sum_{i \in A} c^A_{i \to j} w^A_{i \to j} + d.$$

Define $j^*(i,A) \in K$ as a maximizer of $c^A_{i \to 1}$. It can be seen that the solution to the inner problem in Eq. 26 is to let each AP serve the single UE with the largest weight for each pattern, i.e., $$w^A_{i \to j} = y^A 1(j = j^*(i,A)) \qquad \text{Eq. 27}$$

for $A \subset N$, $i \in A$. Then Eq. 26 can be written as:

$$\text{maximize}_{y^A \geq 0, \sum_{A \subset N} y^A = 1} \sum_{A \subset N} \sum_{i \in A} c^A_{i \to j^*(i,A)} y^A. \qquad \text{Eq. 28}$$

Again, Eq. 28 can be solved by allocating all the resources to one pattern that has the largest weight, i.e., letting $y^{A*}=1$ where A* maximizes $$\sum_{i \in A} c^A_{i \to j^*(i,A)}.$$

Proof of Theorem 1:

To prove Theorem 1, two additional equivalent optimization problems are introduced as bridges between P0 and P1. P0 is equivalent to P4:

$$\text{maximize}_{r,w,y,h} u(r) \qquad \text{P4a}$$

-continued $$\text{subject to } r_j = \sum_{A \subset N} \sum_{i \in A} s^A_{i \to j} \sum_{l \in L} x^{A,l}_{i \to j}, \forall j \in K \quad \text{P4b}$$

$$\sum_{j \in K} w^{A,l}_{i \to j} \leq y^{A,l}, \forall A \subset N, \forall i \in A, \forall l \in L \quad \text{P4c}$$

$$\sum_{A \subset N} y^{A,l} \leq h^l, \forall l \in L \quad \text{P4d}$$

$$\sum_{A \subset N} |y^{A,l}|_0 \leq 1, \forall l \in L \quad \text{P4e}$$

$$\sum_{l \in L} h^l \leq 1, \quad \text{P4f}$$

$$w^{A,l}_{i \to j} \geq 0, \forall l \in L, \forall j \in K, \forall i \in A. \quad \text{P4g}$$

It is first shown that P0 is equivalent to P4 with constraint P4e removed. To see this, it is recognized that the latter problem basically splits the variables in the former into k constituents in identical form. The equivalence is then due to the concavity of the utility function. To be precise, without P4e, if all variables with subscript l is set to 0 except for l=1, P4 reduces to P0. Thus P4 is a relaxation to P0. On the other hand, from any solution to P4 without constraint P4e, the variables of l=1, ..., K can be combined to one feasible solution of P0. Hence the equivalence.

It remains to show that the additional $l_0$ constraint P4e does not change the optimal solution. As indicated above, P0 has an optimal solution that activates at most k patterns by Theorem 1. If the k active patterns each correspond to a distinct subscript l in P4, one obtains a feasible solution to P4 that yields the same utility. Specifically, if the k active patterns found for P0 are $A^1, \ldots, A^k \subset N$, and the optimal w and y variables are $(w^A_{i \to j})_{j \in K, A \subset N, i \in A}$ and $(y^A)_{A \subset N}$. Then the variables of P4 are constructed as follows:

$$h^l = y^{A^l} \quad \text{Eq. 29}$$

$$y^{A,l} = y^A 1(A = A^l) \quad \text{Eq. 30}$$

$$w^{A,l}_{i \to j} = w^A_{i \to j} 1(A = A^l) \quad \text{Eq. 31}$$

for l=1, ..., k. Then it can be seen that all constraints in P4 are satisfied and the same optimal utility is achieved. P4 is equivalent to P5:

$$\text{maximize}_{r,w,y,h} u(r) \quad \text{P5a}$$

$$\text{subject to } r_j = \sum_{A \subset N} \sum_{i \in A} s^A_{i \to j} \sum_{l \in L} x^{A,l}_{i \to j}, \forall j \in K \quad \text{P5b}$$

$$w^{A,l}_{i \to j} \leq z^{A,l}_j, \forall A \subset N, \forall i \in A, \forall l \in L, \forall j \in K \quad \text{P5c}$$

$$z^{A,l}_j + \sum_{B \subset N: B \neq A} z^{B,l}_m \leq 1, \forall A \subset N, \forall l \in L, \forall j, m \in K \quad \text{P5d}$$

$$\sum_{j \in K} \sum_{A \subset N} w^{A,l}_{i \to j} \leq h^l, \forall i \in N, \forall l \in L \quad \text{P5e}$$

$$\sum_{l \in L} h^l \leq 1, \quad \text{P5f}$$

$$z^{A,l}_j \in \{0, 1\}, \forall l \in L, \forall j \in K, \forall A \subset N \quad \text{P5g}$$

$$w^{A,l}_{i \to j} \geq 0, \forall l \in L, \forall j \in K, \forall A \subset N, \forall i \in A. \quad \text{P5h}$$

It is first noted that the utility functions of P4 and P5 are identical. Also, constraints P4b, P4f, and P4g are identical to constraints P5b, P5f, and P5h. Next, it is proven that every maximum of P4 is also a maximum of P5.

Suppose $(r^*, w^*, y^*, h^*)$ is a maximum of P4. The variable $z^*$ is sought such that $(r^*, w^*, z^*, h^*)$ is feasible for P5. Fix $l \in L$. Constraint P4e dictates that there is at most one active global pattern for every $l \in L$. Namely, one can identify one $A_l^* \subset N$, such that $y^{*B,l}=0$ for every $B \neq A_l^*$. From constraints P4c and P4d, it can be seen that:

$$\sum_{j \in K} w^{*A_l^*,l}_{i \to j} \leq h^{*l}, \quad \text{Eq. 32}$$

$$w^{*B,l}_{i \to j} = 0, \forall B \neq A_l^*. \quad \text{Eq. 33}$$

For every i, j, l, and A, let $z^{*A,l}_j = 0$ if $w^{A,l}_{i \to j} = 0$ and otherwise. Then by Eqs. 32 and 33, it can be seen that:

$$z^{*A_l^*,l}_j \leq 1, \quad \text{Eq. 34}$$

$$z^{*B,l}_j = 0, \forall B \neq A_l^*. \quad \text{Eq. 35}$$

It is apparent that these variables satisfy constraints P5c, P5d, and P5g. For the remaining P5e, it can be seen that:

$$\sum_{j \in K} \sum_{A \subset N} w^{*A,l}_{i \to j} = \sum_{j \in K} w^{*A_l^*,l}_{i \to j} \leq h^{*l}. \quad \text{Eq. 36}$$

Therefore, $(r^*, w^*, z^*, h^*)$ is feasible for P5. To show the converse, it is shown that if $(r^*, w^*, z^*, h^*)$ is a maximum of P5, then there exists $y^*$ such that $(r^*, w^*, y^*, h^*)$ is feasible for P4. Fix $l \in L$. Constraints P5d and P5g dictate that there is at most one active global pattern for all $j \in K$. Namely, one can identify one $A_l^* \subset N_j$, such that $z^{*B,l}=0$ for every $B \neq A_l^*$. From constraints P5c, P5e, and P5h, it can be shown that:

$$w^{*B,l}_{i \to j} = 0, \quad \forall B \neq A_l^* \quad \text{Eq. 37}$$

$$\sum_{j \in K} \sum_{A \subset N} w^{*A,l}_{i \to j} = \sum_{j \in K} w^{*A_l^*,l}_{i \to j} \leq h^{*l}. \quad \text{Eq. 38}$$

If $y^*$ is defined as $$y^{*A,l} = \sum_{j \in K} w^{*A_l^*,l}_{i \to j},$$

then it follows that $$y^{*B,l} = 0, \quad \forall B \neq A_l^* \quad \text{Eq. 39}$$

$$y^{*A_l^*,l} = \sum_{j \in K} w^{*A_l^*,l}_{i \to j}. \quad \text{Eq. 40}$$

By Eqs. 39 and 40, it is apparent that $$\sum_{j \in K} w_{i \to j}^{*A,l} \leq y^{*A,l}. \qquad \text{Eq. 41}$$

In addition, it can be seen that $$\sum_{A \subset N} y^{*A,l} = y^{*A_l^*,l} \leq h^{*l}, \qquad \text{Eq. 42}$$

and $$\sum_{A \subset N} |y^{*A,l}|_0 = |y^{*A_l^*,l}|_0 \leq 1. \qquad \text{Eq. 43}$$

Therefore, these variables satisfy constraints P4c, P4d, and P4e. Hence (r*, w*, y*, h*) is also feasible for P4. It is concluded that every maximum of P4 corresponds to a maximum of P5, and vice versa. Hence the equivalence of P4 and P5.

It can also be shown that P5 is equivalent to P1. The difference between P1 and P5 are entirely in the (w, z) variables associated with global patterns and (x, d) variables associated with local patterns. The utilities P5a and P1a are identical. Constraints P5f and P1f are identical. The global variables (w, z) are next related to the local variables (x, d), so that feasibility of P1 and feasibility of P5 imply each other.

It is shown that if (r, w, z, h) satisfy all constraints of P5, then there exist (x, d) such that (r, x, d, h) satisfy all constraints of P1. Let x and d variables be obtained as $$x_{i \to j}^{A,l} = \sum_{C \subset N : C \cap N_j = A} w_{i \to j}^{C,l}, \; \forall \; j \in K, l \in L, A \in N_j, i \in A \qquad \text{Eq. 44}$$

$$d_j^{A,l} = \sum_{C \subset N : C \cap N_j = A} z_j^{C,l}, \; \forall \; j \in K, l \in L, A \in N_j. \qquad \text{Eq. 45}$$

By P5c, P5g, and P5h, it is apparent that P1 c, P1 g, and P1h hold. For every $UE_j \in K$, every local pattern $A \in N_j$, and every global pattern $C \subset N$ that satisfies $C \cap N_j = A$, it can be seen that $s_{i \to j}^C = s_{i \to j}^A$ by Eq. 11. From P5b, Eqs. 11 and 44 indicate for every $j \in K$, $$r_j = \sum_{C \subset N} \sum_{i \in C} s_{i \to j}^C \sum_{l \in L} w_{i \to j}^{C,l} \qquad \text{Eq. 46}$$

$$= \sum_{A \subset N_j} \sum_{C \subset N : C \cap N_j = A} \sum_{i \in C} s_{i \to j}^C \sum_{l \in L} w_{i \to j}^{C,l} \qquad \text{Eq. 47}$$

$$= \sum_{A \subset N_j} \sum_{i \in A} s_{i \to j}^A \sum_{l \in L} \left( \sum_{C \subset N : C \cap N_j = A} w_{i \to j}^{C,l} \right) \qquad \text{Eq. 48}$$

$$= \sum_{A \subset N_j} \sum_{i \in A} s_{i \to j}^A \sum_{l \in L} x_{i \to j}^{A,l} \qquad \text{Eq. 49}$$

which is P1 b. Moreover, fix $l \in L$. Constraints P5d and P5g dictate that there is at most one active global pattern for all $j \in L$. Namely, one can identify one $A_l \subset N$, such that $z_j^{B,l} = 0$ for every $j \in K$ and $B \neq A_l$.

Next, the inequality P1d is examined where d is defined by Eq. 45. For every j, l, m, A, if $A_l \cap N_j = A$, then $$d_j^{A,l} + \sum_{B \subset N_m : B \cap N_j \neq A \cap N_m} d_m^{B,l} = \qquad \text{Eq. 50}$$

$$\sum_{C \subset N : C \cap N_j = A} z_j^{C,l} + \sum_{B \subset N_m : B \cap N_j \neq A \cap N_m} \sum_{D \subset N : D \cap N_m = B} \hat{A} z_m^{D,l}$$

$$= z_j^{A_l,l} + \sum_{D \subset N : D \cap N_m \cap N_j \neq A_l \cap N_m \cap N_j} z_m^{D,l} \qquad \text{Eq. 51}$$

$$\leq z_j^{A_l,l} + \sum_{D \subset N : D \neq A_l} z_m^{D,l} \leq 1 \qquad \text{Eq. 52}$$

where Eq. 52 is due to P5d. If $A_l \cap N_j \neq A$, then $$d_j^{A,l} + \sum_{B \subset N_m : B \cap N_j \neq A \cap N_m} d_m^{B,l} = \qquad \text{Eq. 53}$$

$$\sum_{C \subset N : C \cap N_j = A} z_j^{C,l} + \sum_{B \subset N_m : B \cap N_j \neq A \cap N_m} \sum_{D \subset N : D \cap N_m = B} z_m^{D,l}$$

$$\leq 0 + \sum_{D \subset N} z_m^{D,l} \leq 1 \qquad \text{Eq. 54}$$

where Eq. 54 is due to the special case of P5d with j=m. Therefore P1d is established. It remains to show P1e. By definition of Eq. 44, $$\sum_{j \in K} \sum_{A \subset N_j} x_{i \to j}^{A,l} = \sum_{j \in K} \sum_{A \subset N_j} \sum_{C \subset N : C \cap N_j = A} w_{i \to j}^{C,l} \qquad \text{Eq. 55}$$

$$\leq \sum_{j \in K} \sum_{C \subset N} w_{i \to j}^{C,l} \leq h^l \qquad \text{Eq. 56}$$

where Eq. 56 is due to P5e. Thus (r, x, d, h) satisfy all constraints P1b-P1h as long as (r, w, z, h) satisfy constraints P5b-P5h.

It is next shown that if (r, x, d, h) satisfy all constraints of P1, then there exists (w, z) such that (r, w, z, h) satisfy all constraints of P5. The key is to reconstruct global variables (w, z) from local variables (x, d). Fix $l \in L$. Constraints P1d and P1g dictate that there is at most one active local pattern in every neighborhood. Namely, for every $j \in K$, we can identify one $B_j^l \subset N$, such that $d_j^{B,l} = 0$ for every $B \neq B_j^l$. A global pattern can be defined as:

$$A_l = \bigcup_{j \in K} B_j^l. \qquad \text{Eq. 57}$$

Due to P1d, it can be seen that $A_l \cap N_j = B_j^l$. Define global variables:

$$w_{i \to j}^{C,l} = x_{i \to j}^{B_j^l,l} 1(C = A_l) \qquad \text{Eq. 58}$$

$$z_j^{C,l} = d_j^{B_j^l,l} 1(C = A_l). \qquad \text{Eq. 59}$$

Then P5g and P5h are trivial. Moreover, $$r_j = \sum_{A \subset N_j} \sum_{i \in A} s_{i \to j}^A \sum_{l \in L} x_{i \to j}^{A,l} \quad \text{Eq. 60}$$

$$= \sum_{i \in N_j} \sum_{l \in L} s_{i \to j}^{B_j^l} x_{i \to j}^{B_j^l,l} \quad \text{Eq. 61}$$

$$= \sum_{i \in N} \sum_{l \in L} s_{i \to j}^{A_l} w_{i \to j}^{A_l,l} \quad \text{Eq. 62}$$

$$= \sum_{A \subset N} \sum_{i \in A} s_{i \to j}^A \sum_{l \in L} w_{i \to j}^{A,l}, \quad \text{Eq. 63}$$

where Eq. 62 is due to Eq. 58. Therefore, P5b is established. P5c is established from P1c, Eq. 58, and Eq. 59. In addition, P5d is established due to P1d and Eq. 59. Finally, for P5e, it is shown that:

$$\sum_{j \in K} \sum_{A \subset N} w_{i \to j}^{A,l} = \sum_{j \in K} w_{i \to j}^{A_l,l} \quad \text{Eq. 64}$$

$$= \sum_{j \in K} x_{i \to j}^{B_j^l,l} \quad \text{Eq. 65}$$

$$\leq \sum_{j \in K} \sum_{A \subset N_j} x_{i \to j}^{A,l} \leq h^l \quad \text{Eq. 66}$$

where Eq. 66 is due to P1e. In all, the utility and constraints of P5 are equivalent to those of P1. Hence the equivalence of the two optimization problems.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system for allocating resources in a communication network, the system comprising:
    a plurality of access points, wherein each access point in the plurality of access points is configured to:
        identify traffic information and channel information; and
        transmit the traffic information and the channel information to a central controller; and
    the central controller, wherein the central controller is configured to:
        receive, by a transceiver of the central controller, the traffic information and the channel information from each of the plurality of access points;
        determine, by a processor of the central controller, resource allocation recommendations based at least in part on the received traffic information and the received channel information, wherein the resource allocation recommendations are determined on a timescale measured in seconds, wherein each resource allocation recommendation is specific to a given access point, and wherein the processor of the central controller determines the resource allocation recommendations with a pattern pursuit algorithm; and
        transmit, by the transceiver, the resource allocation recommendations to the plurality of access points; and
    wherein each of the plurality of access points is configured to allocate a resource based on the resource allocation recommendations and on local network information.

2. The system of claim 1, wherein the resource allocation recommendations specify a spectrum segment to allocate to each access point-user equipment link.

3. The system of claim 1, wherein the resource allocation recommendations are configured to optimize quality of service.

4. The system of claim 1, wherein the transceiver of the central controller is further configured to receive information regarding an intensity of traffic intended for each user equipment associated with each of the plurality of access points.

5. The system of claim 4, wherein the processor of the central controller is configured to determine the resource allocation recommendations based in part on the intensity of the traffic intended for each user equipment.

6. The system of claim 1, wherein to implement the pattern pursuit algorithm, the processor of the central controller is configured to optimize a linear approximation of an objective function.

7. The system of claim 6, wherein the objective function is a weighted sum rate, and wherein the weighted sum rate is weighed with a function of a queue length of access point-user equipment links in the communications network.

8. The system of claim 1, wherein the processor of the central controller is configured to update a candidate pattern set, wherein the candidate pattern set includes all possible patterns, and wherein a pattern comprises a subset of the plurality of access points.

9. The system of claim 8, wherein the processor of the central controller is configured to identify one or more patterns from the candidate pattern set that are to receive one or more resources in order to form the resource allocation recommendations.

10. The system of claim 9, wherein the processor of the central controller is further configured to determine whether an optimality gap associated with the resource allocation recommendations is below a threshold.

11. The system of claim 10, wherein the threshold for the optimality gap is a predetermined percentage.

12. The system of claim 1, wherein the plurality of access points comprises at least one hundred access points, and wherein the at least one hundred access points are in communication with at least five hundred user equipments.

13. A method for allocating resources in a communication network, the method comprising:

receiving, by a transceiver of a central controller, traffic information and channel information from each of a plurality of access points;
determining, by a processor of the central controller, resource allocation recommendations using a pattern pursuit algorithm and based at least in part on the received traffic information and the received channel information, and wherein the determining includes:
 updating a candidate pattern set, wherein the candidate pattern set includes all possible patterns, and wherein a pattern comprises a subset of the plurality of access points;
 identifying one or more patterns from the candidate pattern set that are to receive one or more resources; and
 determining whether an optimality gap associated with the resource allocation recommendations is below a threshold; and
 transmitting, by the transceiver, the resource allocation recommendations to the plurality of access points.

14. The method of claim 13, where the transmitting is performed responsive to a determination that the optimality gap is below the threshold.

15. The method of claim 13, wherein determining the resource allocation recommendations comprises identifying a spectrum segment to allocate to each access point-user equipment link.

16. The method of claim 13, further comprising receiving, by the transceiver, information regarding an intensity of traffic intended for each user equipment associated with each of the plurality of access points.

17. The method of claim 16, wherein determining the resource allocation recommendations is performed based in part on the intensity of the traffic intended for each user equipment.

18. The method of claim 13, wherein the threshold is based on a desired level of quality of service.

19. The method of claim 13, wherein the plurality of access points comprises at least one hundred access points, and wherein determining of the resource allocation recommendations is performed on a timescale measured in seconds.

* * * * *